(12) United States Patent
Hsieh et al.

(10) Patent No.: US 10,795,128 B2
(45) Date of Patent: *Oct. 6, 2020

(54) IMAGE CAPTURING OPTICAL LENS ASSEMBLY, IMAGE CAPTURING DEVICE AND ELECTRONIC DEVICE

(71) Applicant: LARGAN PRECISION CO., LTD., Taichung (TW)

(72) Inventors: Tung-Yi Hsieh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 153 days.

This patent is subject to a terminal disclaimer.

(21) Appl. No.: 16/051,770

(22) Filed: Aug. 1, 2018

(65) Prior Publication Data

US 2018/0372999 A1 Dec. 27, 2018

Related U.S. Application Data

(63) Continuation of application No. 14/979,639, filed on Dec. 28, 2015, now Pat. No. 10,073,247.

(30) Foreign Application Priority Data

Nov. 6, 2015 (TW) .............................. 104136688 A

(51) Int. Cl.
*G02B 13/00* (2006.01)
*G02B 9/60* (2006.01)
*G02B 13/06* (2006.01)

(52) U.S. Cl.
CPC .......... *G02B 13/0045* (2013.01); *G02B 9/60* (2013.01); *G02B 13/06* (2013.01)

(58) Field of Classification Search
None
See application file for complete search history.

(56) References Cited

U.S. PATENT DOCUMENTS

| 5,687,028 | A | 11/1997 | Ito |
| 6,208,472 | B1 | 3/2001 | Wachi |
| 7,486,449 | B2 | 2/2009 | Miyano |
| 8,098,441 | B2 | 1/2012 | Sasamoto |
| 8,116,013 | B2 * | 2/2012 | Yoshida .................. G02B 9/60 359/714 |
| 8,166,013 | B2 | 4/2012 | Bandaru et al. |

(Continued)

FOREIGN PATENT DOCUMENTS

| CN | 201503514 U | 6/2010 |
| CN | 102289052 A | 12/2011 |

(Continued)

*Primary Examiner* — Derek S. Chapel
(74) *Attorney, Agent, or Firm* — McClure, Qualey & Rodack, LLP

(57) ABSTRACT

An image capturing optical lens assembly includes, in order from an object side to an image side, a first lens element, a second lens element, a third lens element, a fourth lens element and a fifth lens element. The first lens element has negative refractive power. The second lens element has an object-side surface being convex. The fourth lens element has an image-side surface being convex. The fifth lens element has negative refractive power. A total number of the lens elements in the image capturing optical lens assembly is five.

28 Claims, 20 Drawing Sheets

(56) References Cited

U.S. PATENT DOCUMENTS

| | | | |
|---|---|---|---|
| 8,179,618 B2 | 5/2012 | Baba | |
| 8,243,129 B2 | 8/2012 | Uzawa | |
| 8,422,150 B2 | 4/2013 | Takato | |
| 8,441,529 B2 | 5/2013 | Sasamoto | |
| 8,477,436 B2 | 7/2013 | Sasamoto | |
| 8,508,861 B2 | 8/2013 | Tsai et al. | |
| 8,654,457 B2 | 2/2014 | Jin et al. | |
| 10,012,818 B2 * | 7/2018 | Tang | G02B 9/64 |
| 10,018,807 B2 * | 7/2018 | Tang | G02B 13/0045 |
| 10,228,535 B2 * | 3/2019 | Hsieh | G02B 9/62 |
| 10,247,913 B2 * | 4/2019 | Tang | G02B 13/0045 |
| 2009/0086017 A1 | 4/2009 | Miyano | |
| 2014/0078603 A1 | 3/2014 | You | |
| 2014/0307335 A1 | 10/2014 | Kawamura | |
| 2014/0307337 A1 | 10/2014 | Kawamura | |
| 2014/0307338 A1 | 10/2014 | Kawamura | |
| 2015/0268452 A1 | 9/2015 | Kawamura | |
| 2016/0139365 A1 | 5/2016 | Tang et al. | |
| 2016/0377835 A1 | 12/2016 | Liu et al. | |
| 2017/0017065 A1 | 1/2017 | Liu et al. | |
| 2017/0017066 A1 | 1/2017 | Liu et al. | |
| 2017/0059823 A1 | 3/2017 | Tang et al. | |
| 2017/0059824 A1 | 3/2017 | Tang et al. | |
| 2019/0170979 A1 * | 6/2019 | Hsieh | G02B 9/62 |

FOREIGN PATENT DOCUMENTS

| | | |
|---|---|---|
| JP | H06-222263 A | 8/1994 |
| JP | H09-096761 A | 4/1997 |
| JP | 2005-148614 A | 6/2005 |
| JP | 2007-127954 A | 5/2007 |
| JP | 2009-080413 A | 4/2009 |
| JP | 2009-109576 A | 5/2009 |
| JP | 2010-107532 A | 5/2010 |
| JP | 2010-243711 A | 10/2010 |
| JP | 2013-210538 A | 10/2013 |
| JP | 2013-210543 A | 10/2013 |
| JP | 2015-034885 A | 2/2015 |
| TW | 201317610 A1 | 5/2013 |
| TW | M495520 U | 2/2015 |
| WO | 2008-081903 A1 | 7/2008 |
| WO | 2013-099211 A1 | 7/2013 |
| WO | 2013-099212 A1 | 7/2013 |
| WO | 2013-099213 A1 | 7/2013 |

\* cited by examiner

IMAGE CAPTURING OPTICAL LENS ASSEMBLY, IMAGE CAPTURING DEVICE AND ELECTRONIC DEVICE

RELATED APPLICATIONS

The present application is a continuation of the application Ser. No. 14/979,639, filed Dec. 28, 2015, now U.S. Pat. No. 10,073,247, which claims priority to Taiwan Application Serial Number 104136688, filed Nov. 6, 2015, which is herein incorporated by reference.

BACKGROUND

Technical Field

The present disclosure relates to an image capturing optical lens assembly and an image capturing device. More particularly, the present disclosure relates to an image capturing optical lens assembly and an image capturing device with a wide field of view applicable to electronic devices.

Description of Related Art

In recent years, with the popularity of various camera applications with different functionalities, many products, such as household appliances, game consoles, monitors, vehicles, electronic products and mobile devices, are equipped with optical lens assemblies, which are suitable for image assistances, image identifications and motion detections. Some of the products are required to be operated in low light environments, such as infrared devices for detecting the location of human. Thus, the optical lens assemblies of the products obtaining sufficient light would be necessary. However, conventional optical lens assemblies applied to these products usually have smaller apertures and are not suitable for low light environments; or have large apertures but with insufficient resolution power.

SUMMARY

According to one aspect of the present disclosure, an image capturing optical lens assembly includes, in order from an object side to an image side, a first lens element, a second lens element, a third lens element, a fourth lens element and a fifth lens element. The first lens element with negative refractive power has an image-side surface being concave. The third lens element has an image-side surface being convex. The fourth lens element has positive refractive power. The fifth lens element has an object-side surface being concave. The image capturing optical lens assembly has a total of five lens elements. When a number of the lens elements having an Abbe number smaller than 40 is Nv40, a focal length of the first lens element is f1, a focal length of the fourth lens element is f4, a maximal image height of the image capturing optical lens assembly is ImgH, an entrance pupil diameter of the image capturing optical lens assembly is EPD, an axial distance between an object-side surface of the first lens element and an image surface is TL, and a focal length of the image capturing optical lens assembly is f, the following conditions are satisfied:

$3 \leq Nv40$;

$0.30 < |f4/f1| < 2.0$;

$0.80 < ImgH/EPD < 4.0$; and $3.0 < TL/f$.

According to another aspect of the present disclosure, an image capturing device includes the image capturing optical lens assembly according to the aforementioned aspect and an image sensor, wherein the image sensor is disposed on the image surface of the image capturing optical lens assembly.

According to yet another aspect of the present disclosure, an electronic device includes the image capturing device according to the aforementioned aspect.

According to further another aspect of the present disclosure, an image capturing optical lens assembly includes, in order from an object side to an image side, a first lens element, a second lens element, a third lens element, a fourth lens element and a fifth lens element. The first lens element with negative refractive power has an image-side surface being concave. The third lens element has an image-side surface being convex. The fourth lens element has positive refractive power. The fifth lens element has an object-side surface being concave. The image capturing optical lens assembly has a total of five lens elements. When a number of the lens elements having an Abbe number smaller than 40 is Nv40, a focal length of the first lens element is f1, a focal length of the second lens element is f2, a focal length of the third lens element is f3, a focal length of the fourth lens element is f4, a focal length of the fifth lens element is f5, a maximal image height of the image capturing optical lens assembly is ImgH, and an entrance pupil diameter of the image capturing optical lens assembly is EPD, the following conditions are satisfied:

$3 \leq Nv40$;

$0.30 < |f4/f1| < 2.0$;

$0.80 < ImgH/EPD < 4.0$;

$|f4| < |f2|$;

$|f4| < |f3|$; and $|f4| < |f5|$.

According to still another aspect of the present disclosure, an image capturing device includes the image capturing optical lens assembly according to the aforementioned aspect and an image sensor, wherein the image sensor is disposed on an image surface of the image capturing optical lens assembly.

According to yet another aspect of the present disclosure, an electronic device includes the image capturing device according to the aforementioned aspect.

According to further another aspect of the present disclosure, an image capturing optical lens assembly which is applied to a light wavelength range between 850 nm and 1200 nm, includes, in order from an object side to an image side, a first lens element, a second lens element, a third lens element, a fourth lens element and a fifth lens element. The image capturing optical lens assembly has a total of five lens elements. When a maximal image height of the image capturing optical lens assembly is ImgH, an entrance pupil diameter of the image capturing optical lens assembly is EPD, an axial distance between an object-side surface of the first lens element and an image surface is TL, a focal length of the image capturing optical lens assembly is f, and a maximal field of view of the image capturing optical lens assembly is FOV, the following conditions are satisfied:

$0.80 < ImgH/EPD < 4.0$;

3.0<TL/f; and 100 degrees<FOV.

According to still another aspect of the present disclosure, an image capturing device includes the image capturing optical lens assembly according to the aforementioned aspect and an image sensor, wherein the image sensor is disposed on the image surface of the image capturing optical lens assembly.

According to yet another aspect of the present disclosure, an electronic device includes the image capturing device according to the aforementioned aspect.

DETAILED DESCRIPTION

Figure 1:
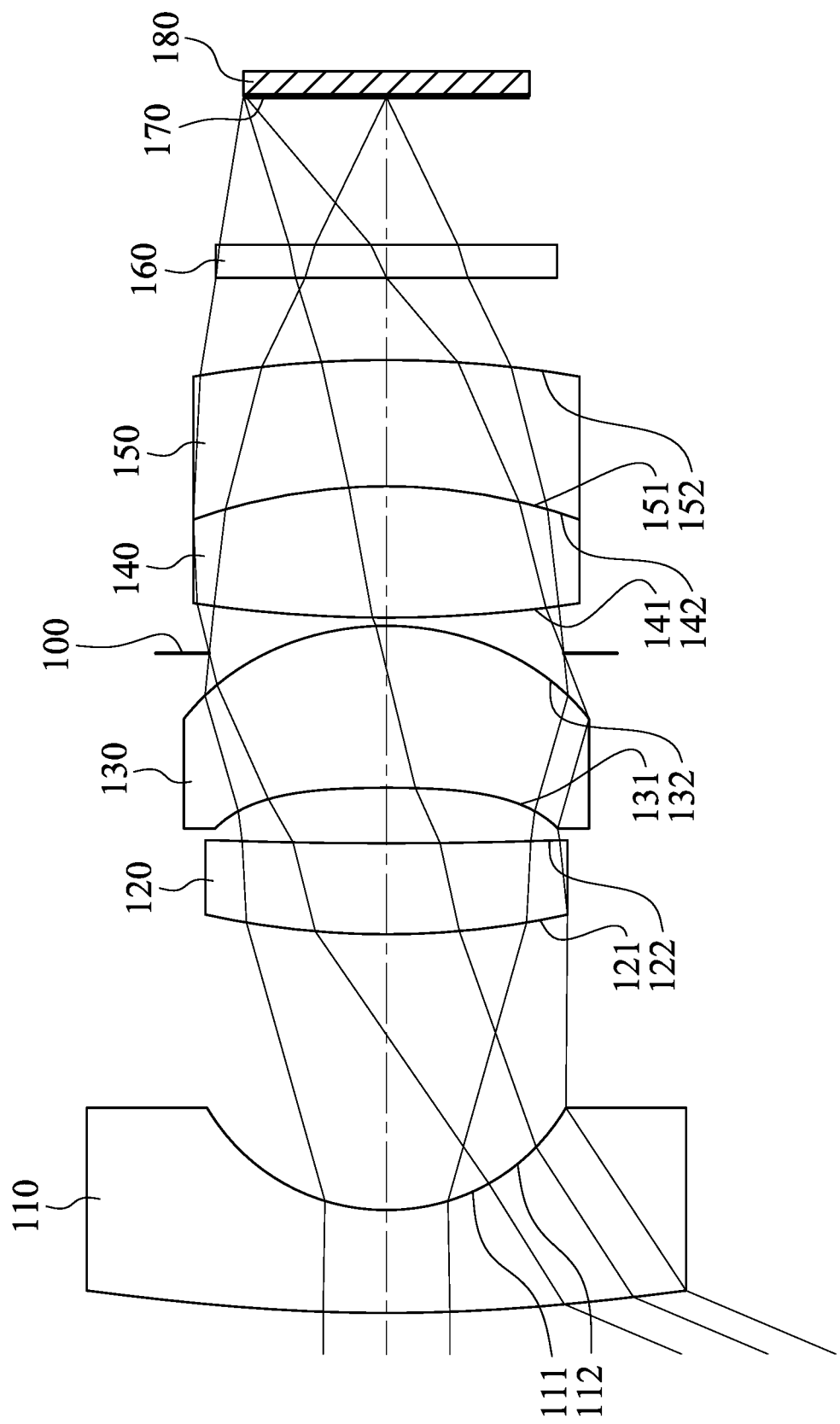
FIG. 1 is a schematic view of an image capturing device according to the 1st embodiment of the present disclosure.

An image capturing optical lens assembly includes, in order from an object side to an image side, a first lens element, a second lens element, a third lens element, a fourth lens element and a fifth lens element, wherein the image capturing optical lens assembly has a total of five lens elements.

The image capturing optical lens assembly of the present disclosure can be applied to a light wavelength range between 850 nm and 1200 nm, such as an infrared light. Therefore, the captured image can be identified or detected under the situation which would not interfere with the human eye, or it is favorable for night image detections.

The image capturing optical lens assembly can further include an aperture stop, wherein the lens elements disposed between an imaged object and the aperture stop are defined as a front lens group, the lens elements disposed between the aperture stop and the image surface are defined as a rear lens group.

The first lens element can have negative refractive power and can have an image-side surface being concave. Therefore, it is favorable for the off-axial light with a larger field of view traveling into the image capturing optical lens assembly so as to enlarge the image capturing range.

The third lens element can have an image-side surface being convex, so that it is favorable for enhancing the image quality by reducing astigmatism and spherical aberration.

The fourth lens element can have positive refractive power, so that it is favorable for convergence of the incident light on an image surface, and enhancing the light converging ability of the image capturing optical lens assembly.

The fifth lens element can have an object-side surface being concave, so that it is favorable for enhancing the image quality by enhancing the ability for correcting aberrations.

When a number of the lens elements having an Abbe number smaller than 40 is Nv40, the following condition is satisfied: 3≤Nv40. Therefore, it is favorable for maintaining the balance between the image quality and lens configurations. Preferably, the following condition can be satisfied: 4≤Nv40.

When a focal length of the first lens element is f1, and a focal length of the fourth lens element is f4, the following condition is satisfied: 0.30<|f4/f1|<2.0. Therefore, it is favorable for balancing the distribution of the refractive power between the front lens group and the rear lens group, so that the ability for correcting aberrations can be enhanced. Preferably, the following condition can be satisfied: 0.50<|f4/f1|<1.50.

When a maximal image height of the image capturing optical lens assembly is ImgH, and an entrance pupil diameter of the image capturing optical lens assembly is EPD, the following condition is satisfied: 0.80<ImgH/EPD<4.0. Therefore, it is favorable for providing sufficient light at the center of the image capturing optical lens assembly when the image capturing optical lens assembly has a larger field of view. Preferably, the following condition can be satisfied: 1.0<ImgH/EPD<2.5. More preferably, the following condition can be satisfied: 1.0<ImgH/EPD<1.6.

When an axial distance between an object-side surface of the first lens element and the image surface is TL, and a focal length of the image capturing optical lens assembly is f, the following condition is satisfied: 3.0<TL/f. Therefore, it is favorable for enlarging the image capturing range by ensuring the image capturing optical lens assembly with sufficient field of view. Preferably, the following condition can be satisfied: 4.0<TL/f<10.0.

When a focal length of the second lens element is f2, a focal length of the third lens element is f3, the focal length of the fourth lens element is f4, and a focal length of the fifth lens element is f5, the following conditions are satisfied: |f4|<|f2|; |f4|<|f3|; and |f1|<|f5|. Therefore, it is favorable for avoiding the excessive difference of refractive power of the lens elements by moderating the variation of the refractive power among the lens elements of the image capturing optical lens assembly, so that the problem of insufficient aberration correction or excessive aberration correction can be avoided, and it is also favorable for reducing the photosensitivity thereof.

When a maximal field of view of the image capturing optical lens assembly is FOV, the following condition is satisfied: 100 degrees<FOV. Therefore, it is favorable for enhancing the feature of the large field of view of the image capturing optical lens assembly. Preferably, the following condition can be satisfied: 110 degrees<FOV.

When a radius of the aperture stop is SDstop, and an average value of maximal optical effective radii of object-side surfaces and image-side surfaces of the second lens element, the third lens element, the fourth lens element and the fifth lens element is SDavg, the following condition is satisfied: 0.75<SDavg/SDstop<1.35. Therefore, it is favorable for providing the off-axial region of the image capturing optical lens assembly with sufficient field of view.

When a number of the lens elements having the Abbe number smaller than 30 is Nv30, the following condition is satisfied: 3≤Nv30. Therefore, it is favorable for enhancing the balance between the image quality and desirable lens configurations.

A composite focal length of the lens elements disposed between the imaged object and the aperture stop is a positive value, and a composite focal length of the lens elements disposed between the aperture stop and the image surface is a positive value. Therefore, the back focal length of the image capturing optical lens assembly can be reduced, the variation of the refractive power among the lens elements can be moderated, the manufacturing sensitivity of the image capturing optical lens assembly can be reduced effectively, and the problem of insufficient or excessive aberration corrections can be avoided.

When the focal length of the image capturing optical lens assembly is f, and the entrance pupil diameter of the image capturing optical lens assembly is EPD, the following condition is satisfied: f/EPD<1.80. Therefore, it is favorable for obtaining a large aperture and high image quality.

When a curvature radius of an object-side surface of the third lens element is R5, and a curvature radius of an image-side surface of the third lens element is R6, the following condition is satisfied: 0<(R5+R6)/(R5−R6)<3.0. Therefore, it is favorable for enhancing the image quality by reducing astigmatism and spherical aberration effectively.

When a maximal optical effective radius of an object-side surface of the first lens element is SD11, and the average value of maximal optical effective radii of object-side surfaces and image-side surfaces of the second lens element, the third lens element, the fourth lens element and the fifth lens element is SDavg, the following condition is satisfied: 1.25<SD11/SDavg<2.5. Therefore, it is favorable for obtaining the compact size of the image capturing optical lens assembly by moderating the difference of the effective radii of the lens elements near the object side and the lens elements near the image side.

Furthermore, in the front lens group, at least one lens element is made of a glass material, so that the environment effect toward the image capturing optical lens assembly can be reduced; or at least one lens element is made of a plastic material, so that the mass production capability can be enhanced, and the manufacturing cost can be reduced.

According to the image capturing optical lens assembly of the present disclosure, the lens elements thereof can be made of glass or plastic materials. When the lens elements are made of glass materials, the distribution of the refractive power of the image capturing optical lens assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the image capturing optical lens assembly. Therefore, the total track length of the image capturing optical lens assembly can also be reduced.

According to the image capturing optical lens assembly of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly, when the lens element has a convex surface, it indicates that the surface can be convex in the paraxial region thereof; when the lens element has a concave surface, it indicates that the surface can be concave in the paraxial region thereof.

According to the image capturing optical lens assembly of the present disclosure, the refractive power or the focal length of a lens element being positive or negative may refer to the refractive power or the focal length in a paraxial region of the lens element.

According to the image capturing optical lens assembly of the present disclosure, the image capturing optical lens assembly can include at least one stop, such as an aperture stop, a glare stop or a field stop. Said glare stop or said field stop is for eliminating the stray light and thereby improving the image resolution thereof.

According to the image capturing optical lens assembly of the present disclosure, the image surface of the image capturing optical lens assembly, based on the corresponding image sensor, can be flat or curved. In particular, the image surface can be a curved surface being concave facing towards the object side.

According to the image capturing optical lens assembly of the present disclosure, an aperture stop can be configured as a middle stop. A middle stop disposed between the first lens element and the image surface is favorable for enlarging the field of view of the image capturing optical lens assembly and thereby provides a wider field of view for the same.

According to the image capturing optical lens assembly of the present disclosure, the image capturing optical lens assembly can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an image capturing device is provided. The image capturing device includes the aforementioned image capturing optical lens assembly and an image sensor, wherein the image sensor is disposed on the image side of the aforementioned image capturing optical lens assembly, that is, the image sensor can be disposed on or near the image surface of the aforementioned image capturing optical lens assembly. By the optimized distribution of the lens elements of the aforementioned image capturing optical lens assembly and the refractive power thereof, it is favorable for obtaining large aperture and high image quality, especially the image capturing optical lens assembly can be applied to wavelengths of an infrared light between 850 nm and 1200 nm. Preferably, the image capturing device can further include a barrel member, a holder member or a combination thereof.

According to the present disclosure, an electronic device is provided, which includes the aforementioned image capturing device. Therefore, image quality of the electronic device can be improved. Preferably, the electronic device can further include but not limited to a control unit, a display, a storage unit, a random access memory unit (RAM) or a combination thereof.

According to the above description of the present disclosure, the following 1st-11th specific embodiments are provided for further explanation.

1st Embodiments

Figure 2:
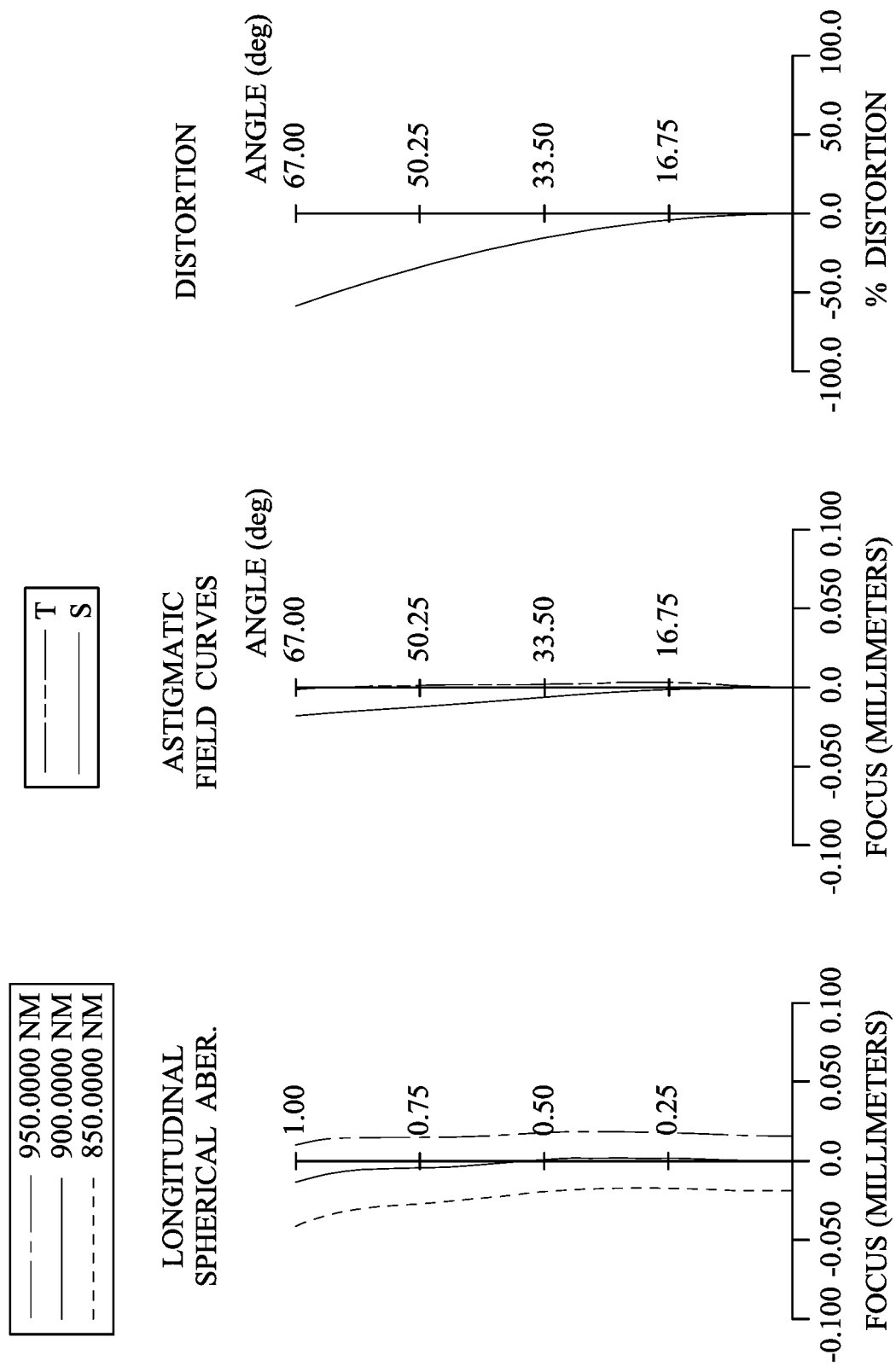
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes an image capturing optical lens assembly (its reference numeral is omitted) and an image sensor 180. The image capturing optical lens assembly includes, in order from an object side to an image side, a first lens element 110, a second lens element 120, a third lens element 130, an aperture stop 100, a fourth lens element 140, a fifth lens element 150, a filter 160 and an image surface 170, wherein the image sensor 180 is disposed on the image surface 170 of the image capturing optical lens assembly. The image capturing optical lens assembly has a total of five lens elements (110-150).

The first lens element 110 with negative refractive power has an object-side surface 111 being convex and an image-side surface 112 being concave. The first lens element 110 is made of a glass material, and has the object-side surface 111 and the image-side surface 112 being both aspheric.

The second lens element 120 with positive refractive power has an object-side surface 121 being convex and an image-side surface 122 being concave. The second lens element 120 is made of a glass material, and has the object-side surface 121 and the image-side surface 122 being both spherical.

The third lens element 130 with positive refractive power has an object-side surface 131 being concave and an image-side surface 132 being convex. The third lens element 130 is made of a plastic material, and has the object-side surface 131 and the image-side surface 132 being both aspheric.

The fourth lens element 140 with positive refractive power has an object-side surface 141 being convex and an image-side surface 142 being convex. The fourth lens element 140 is made of a glass material, and has the object-side surface 141 and the image-side surface 142 being both spherical.

The fifth lens element 150 with negative refractive power has an object-side surface 151 being concave and an image-side surface 152 being convex, wherein the image-side surface 142 of the fourth lens element 140 and the object-side surface 151 of the fifth lens element 150 are cemented. The fifth lens element 150 is made of a glass material, and has the object-side surface 151 and the image-side surface 152 being both spherical.

The filter 160 is made of a glass material and located between the fifth lens element 150 and the image surface 170, and will not affect the focal length of the image capturing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image capturing optical lens assembly according to the 1st embodiment, when a focal length of the image capturing optical lens assembly is f, an entrance pupil diameter of the image capturing optical lens assembly is EPD, the following conditions are satisfied: f=1.77 mm; and f/EPD=1.15, where f/EPD is also the definition of a f-number (Fno).

In the image capturing optical lens assembly according to the 1st embodiment, when half of a maximal field of view of the image capturing optical lens assembly is HFOV, and the maximal field of view of the image capturing optical lens assembly is FOV, and the following conditions are satisfied: HFOV=67.0 degrees; and FOV=134.0 degrees.

In the image capturing optical lens assembly according to the 1st embodiment, when a number of the lens elements having an Abbe number smaller than 30 is Nv30, and a number of the lens elements having the Abbe number smaller than 40 is Nv40, and the following conditions are satisfied: Nv30=4; and Nv40=4. In detail, in the 1st embodiment, both Nv30 and Nv40 are equal to 4, and the lens elements which having an Abbe number smaller than 30 and smaller than 40 are the first lens element 110, the second lens element 120, the third lens element 130 and the fourth lens element 140.

In the image capturing optical lens assembly according to the 1st embodiment, when an axial distance between the object-side surface 111 of the first lens element 110 and the image surface 170 is TL, and the focal length of the image capturing optical lens assembly is f, the following condition is satisfied: TL/f=8.36.

In the image capturing optical lens assembly according to the 1st embodiment, when a maximal image height of the image capturing optical lens assembly is ImgH (half of a diagonal length of an effective photosensitive area of the image sensor 180), and the entrance pupil diameter of the image capturing optical lens assembly is EPD, the following condition is satisfied: ImgH/EPD=1.13.

Figure 17:
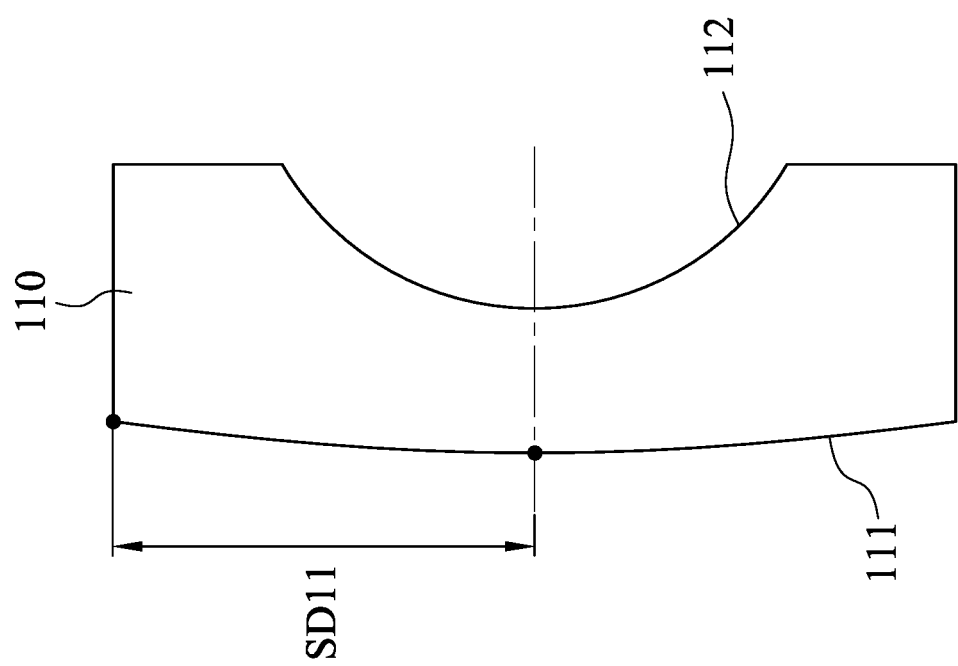
FIG. 17 is a schematic view of a parameter SD11 according to the 1st embodiment of FIG. 1.

FIG. 17 is a schematic view of a parameter SD11 according to the 1st embodiment of FIG. 1. In FIG. 17, a maximal optical effective radius of an object-side surface 111 of the first lens element 110 is SD11, an average value of maximal optical effective radii of object-side surfaces and image-side surfaces of the second lens element 120, the third lens element 130, the fourth lens element 140 and the fifth lens element 150 is SDavg, and a radius of the aperture stop 100 is SDstop, the following conditions are satisfied: SD11/SDavg=1.61; and SDavg/SDstop=1.05.

In the image capturing optical lens assembly according to the 1st embodiment, when a curvature radius of the object-side surface 131 of the third lens element 130 is R5, and a curvature radius of the image-side surface 132 of the third lens element 130 is R6, the following condition is satisfied: (R5−R6)/(R5−R6)=1.77.

In the image capturing optical lens assembly according to the 1st embodiment, when a focal length of the first lens element 110 is f1, and a focal length of the fourth lens element 140 is f4, the following condition is satisfied: |f4/f1|=1.65.

The detailed optical data of the 1st embodiment are shown in Table 1 and the aspheric surface data are shown in Table 2 below.

element 150 is f5, the following conditions are satisfied: |f4|<|f2|; |f4|<|f3|; and |f4|<|f5|.

Furthermore, according to the 1st embodiment, a composite focal length of the lens elements disposed between an imaged object and the aperture stop 100 (the first lens element 110, the second lens element 120 and the third lens element 130) is a positive value, and a composite focal length of the lens elements disposed between the aperture stop 100 and the image surface 170 (the fourth lens element 140 and the fifth lens element 150) is a positive value.

2nd Embodiment

Figure 3:
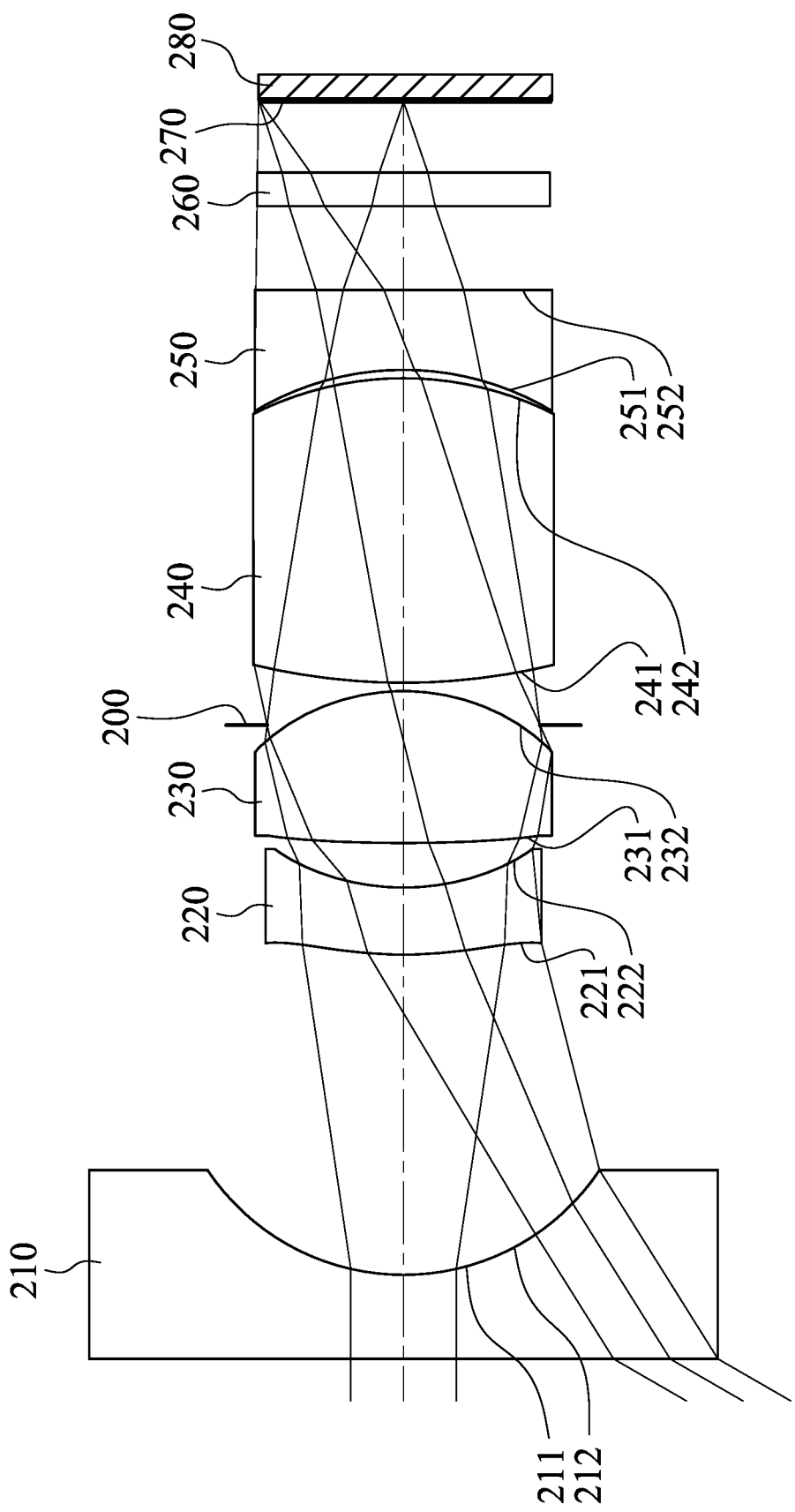
FIG. 3 is a schematic view of an image capturing device according to the 2nd embodiment of the present disclosure.
Figure 4:
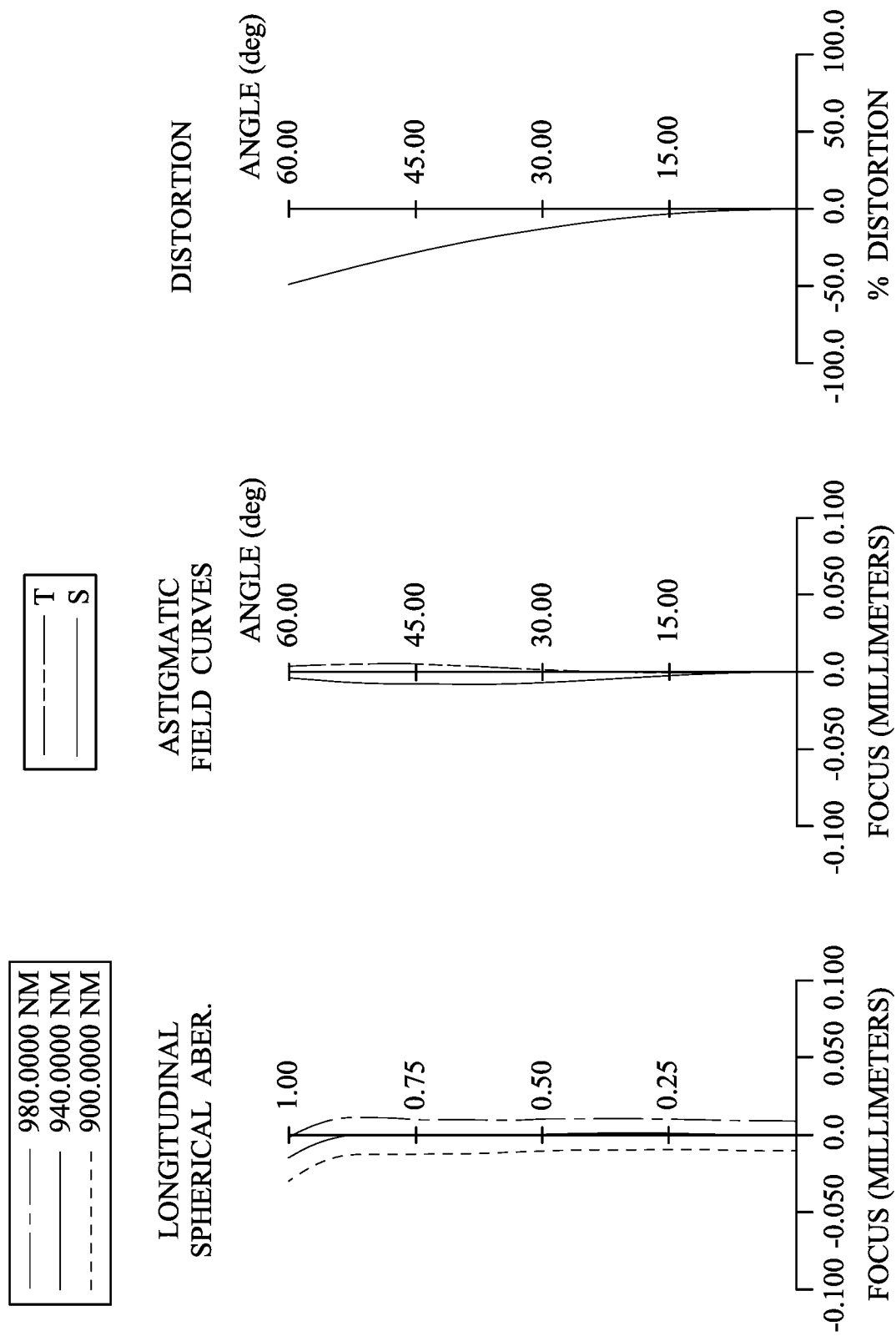
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field

TABLE 1

1st Embodiment
f = 1.77 mm, Fno = 1.15, HFOV = 67.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 22.107 | ASP | 1.250 | Glass | 1.963 | 20.7 | −3.14 |
| 2 | | 2.586 | ASP | 3.355 | | | | |
| 3 | Lens 2 | 10.257 | | 1.106 | Glass | 1.967 | 21.0 | 12.65 |
| 4 | | 59.907 | | 0.677 | | | | |
| 5 | Lens 3 | −12.317 | ASP | 1.968 | Plastic | 1.635 | 20.4 | 6.89 |
| 6 | | −3.429 | ASP | −0.334 | | | | |
| 7 | Ape. Stop | Plano | | 0.434 | | | | |
| 8 | Lens 4 | 15.761 | | 1.596 | Glass | 1.967 | 21.0 | 5.19 |
| 9 | Lens 5 | −7.008 | | 1.537 | Glass | 1.509 | 64.2 | −30.42 |
| 10 | | −13.750 | | 1.000 | | | | |
| 11 | Filter | Plano | | 0.400 | Glass | 1.509 | 64.2 | — |
| 12 | | Plano | | 1.807 | | | | |
| 13 | Image | Plano | | — | | | | |

Reference wavelength is 900 nm.

TABLE 2

| | Aspheric Coefficients | | | |
|---|---|---|---|---|
| Surface # | 1 | 2 | 5 | 6 |
| k = | −1.4471E+00 | 5.0050E−02 | 3.0167E+01 | −3.8383E−01 |
| A4 = | −1.8650E−05 | 1.3186E−03 | −9.3073E−03 | −1.8649E−03 |
| A6 = | −1.2861E−05 | −2.5137E−04 | −1.9710E−04 | −3.2601E−04 |
| A8 = | −1.3085E−08 | 1.0084E−04 | −1.1894E−04 | 2.0147E−05 |
| A10 = | 1.3872E−08 | −1.4007E−05 | −7.4947E−07 | −5.9894E−06 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

Moreover, according to the 1st embodiment, a focal length of the second lens element 120 is f2, a focal length of the third lens element 130 is f3, the focal length of the fourth lens element 140 is f4, and a focal length of the fifth lens curves and a distortion curve of the image capturing device according to the 2nd embodiment. In FIG. 3, the image capturing device includes an image capturing optical lens assembly (its reference numeral is omitted) and an image sensor 280. The image capturing optical lens assembly includes, in order from an object side to an image side, a first lens element 210, a second lens element 220, a third lens element 230, an aperture stop 200, a fourth lens element 240, a fifth lens element 250, a filter 260 and an image surface 270, wherein the image sensor 280 is disposed on the image surface 270 of the image capturing optical lens assembly. The image capturing optical lens assembly has a total of five lens elements (210-250).

The first lens element 210 with negative refractive power has an object-side surface 211 being planar and an image-side surface 212 being concave. The first lens element 210 is made of a glass material, and has the object-side surface 211 and the image-side surface 212 being both spherical.

The second lens element 220 with negative refractive power has an object-side surface 221 being convex and an image-side surface 222 being concave. The second lens element 220 is made of a plastic material, and has the object-side surface 221 and the image-side surface 222 being both aspheric.

The third lens element 230 with positive refractive power has an object-side surface 231 being convex and an image-side surface 232 being convex. The third lens element 230 is made of a plastic material, and has the object-side surface 231 and the image-side surface 232 being both aspheric.

The fourth lens element 240 with positive refractive power has an object-side surface 241 being convex and an image-side surface 242 being convex. The fourth lens element 240 is made of a glass material, and has the object-side surface 241 and the image-side surface 242 being both spherical.

The fifth lens element 250 with negative refractive power has an object-side surface 251 being concave and an image-side surface 252 being planar. The fifth lens element 250 is made of a glass material, and has the object-side surface 251 and the image-side surface 252 being both spherical.

The filter 260 is made of a glass material and located between the fifth lens element 250 and the image surface 270, and will not affect the focal length of the image capturing optical lens assembly.

The detailed optical data of the 2nd embodiment are shown in Table 3 and the aspheric surface data are shown in Table 4 below.

same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.95 | TL/f | 7.69 |
| f/EPD | 1.55 | ImgH/EPD | 1.37 |
| HFOV [deg.] | 60.0 | SD11/SDavg | 2.20 |
| FOV [deg.] | 120.0 | SDavg/SDstop | 1.05 |
| Nv30 | 2 | (R5 + R6)/(R5 − R6) | 0.73 |
| Nv40 | 4 | |f4/f1| | 0.84 |

Moreover, according to the 2nd embodiment, a focal length of the second lens element 220 is f2, a focal length of the third lens element 230 is f3, the focal length of the fourth lens element 240 is f4, and a focal length of the fifth lens element 250 is f5, the following conditions are satisfied: |f4|<|f2|; |f4|<|f3|; and |f4|<|f5|.

Furthermore, according to the 2nd embodiment, a composite focal length of the lens elements disposed between an imaged object and the aperture stop 200 (the first lens element 210, the second lens element 220 and the third lens element 230) is a positive value, and a composite focal length of the lens elements disposed between the aperture stop 200 and the image surface 270 (the fourth lens element 240 and the fifth lens element 250) is a positive value.

TABLE 3

2nd Embodiment
f = 1.95 mm, Fno = 1.55, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | Plano | | 1.000 | Glass | 1.630 | 33.8 | −4.45 |
| 2 | | 2.806 | | 3.817 | | | | |
| 3 | Lens 2 | 4.914 | ASP | 0.800 | Plastic | 1.634 | 20.4 | −13.52 |
| 4 | | 2.926 | ASP | 0.530 | | | | |
| 5 | Lens 3 | 16.916 | ASP | 1.811 | Plastic | 1.566 | 30.2 | 4.13 |
| 6 | | −2.611 | ASP | −0.405 | | | | |
| 7 | Ape. Stop | Plano | | 0.505 | | | | |
| 8 | Lens 4 | 7.578 | | 3.629 | Glass | 1.816 | 23.8 | 3.72 |
| 9 | | −3.973 | | 0.100 | | | | |
| 10 | Lens 5 | −3.438 | | 0.952 | Glass | 1.630 | 60.1 | −5.46 |
| 11 | | Plano | | 1.000 | | | | |
| 12 | Filter | Plano | | 0.400 | Glass | 1.508 | 64.2 | — |
| 13 | | Plano | | 0.858 | | | | |
| 14 | Image | Plano | | — | | | | |

Reference wavelength is 940 nm.

TABLE 4

Aspheric Coefficients

| Surface # | 3 | 4 | 5 | 6 |
|---|---|---|---|---|
| k = | −4.1024E−01 | 1.1590E+00 | −8.2610E+01 | 1.8811E−01 |
| A4 = | −9.9537E−03 | −3.9970E−03 | 1.0279E−03 | 7.2772E−04 |
| A6 = | −3.5876E−03 | −2.7422E−03 | 2.2269E−04 | −5.9604E−04 |
| A8 = | 7.1500E−04 | 7.4815E−04 | −2.6687E−04 | 1.9363E−04 |
| A10 = | −2.6165E−04 | 4.5602E−05 | 2.1483E−04 | −5.5602E−05 |
| A12 = | | | 6.4220E−18 | 6.4110E−18 |

In the 2nd embodiment, the equation of the aspheric surface profiles of the aforementioned lens elements is the

3rd Embodiment

Figure 5:
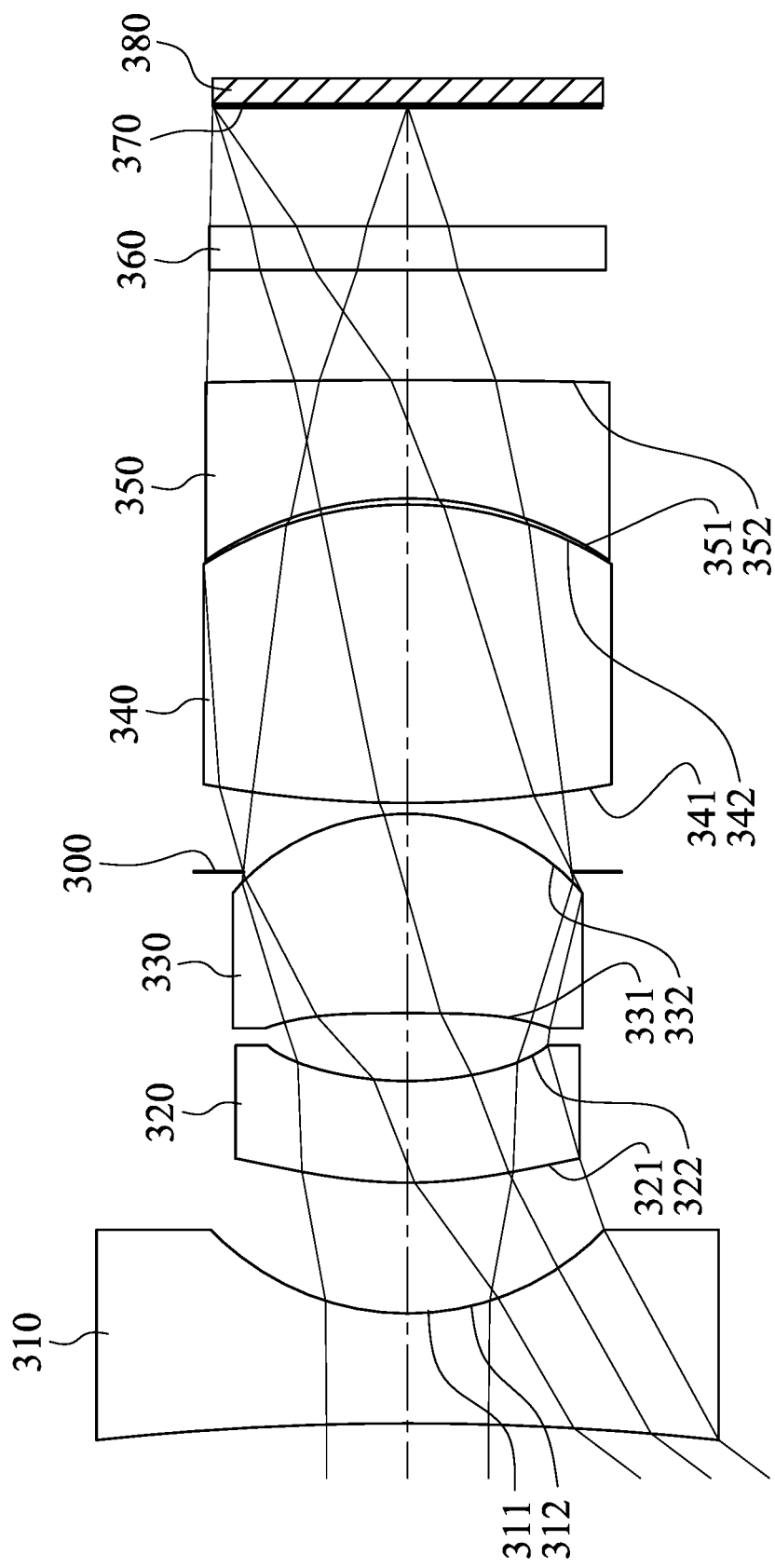
FIG. 5 is a schematic view of an image capturing device according to the 3rd embodiment of the present disclosure.
Figure 6:
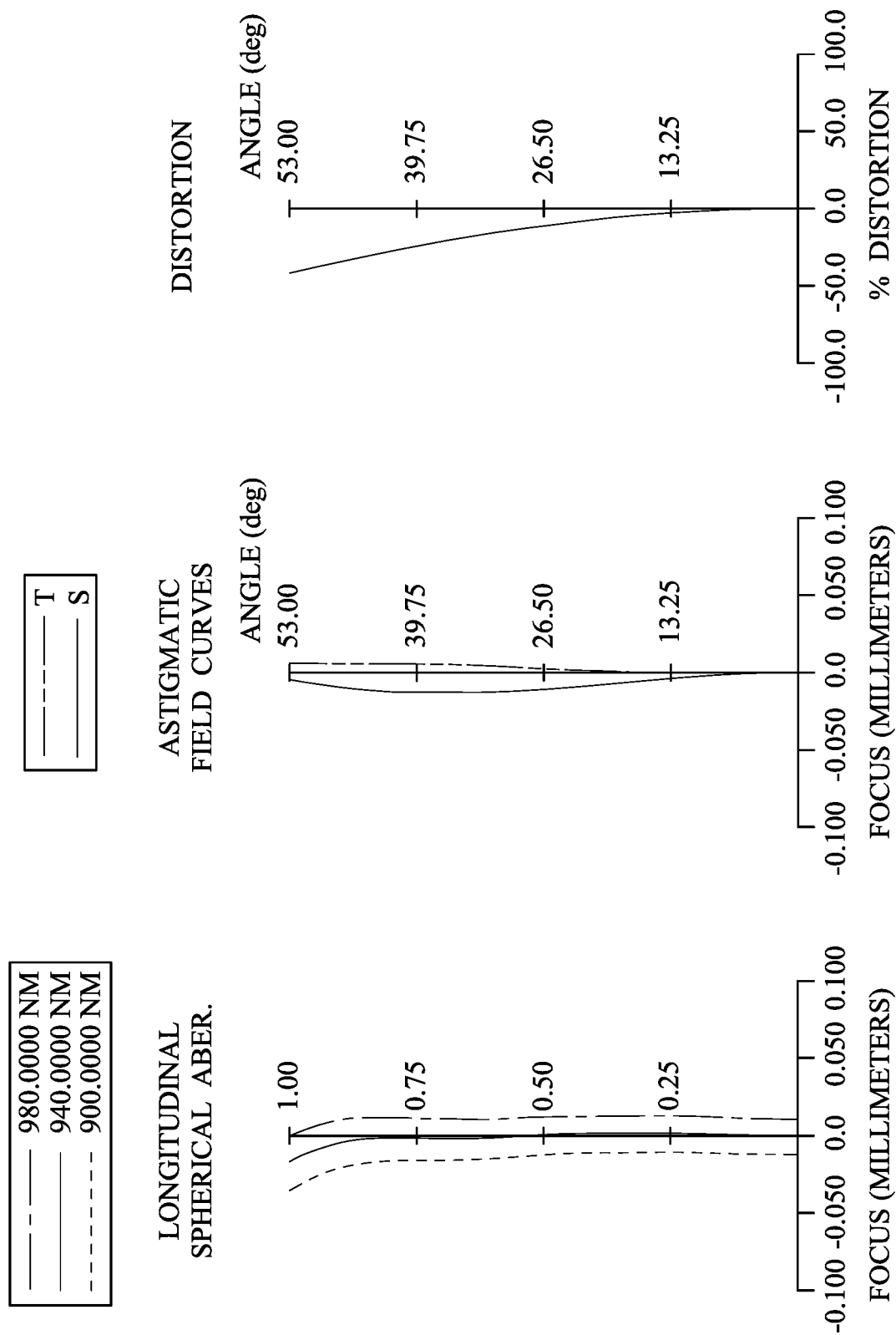
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment. In FIG. 5, the image capturing device includes an image capturing optical lens assembly (its reference numeral is omitted) and an image sensor 380. The image capturing optical lens assembly includes, in order from an object side to an image side, a first lens element 310, a second lens element 320, a third lens element 330, an aperture stop 300, a fourth lens element 340, a fifth lens element 350, a filter 360 and an image surface 370, wherein the image sensor 380 is disposed on the image surface 370 of the image capturing optical lens assembly. The image capturing optical lens assembly has a total of five lens elements (310-350).

The first lens element 310 with negative refractive power has an object-side surface 311 being concave and an image-side surface 312 being concave. The first lens element 310 is made of a glass material, and has the object-side surface 311 and the image-side surface 312 being both spherical.

The second lens element 320 with negative refractive power has an object-side surface 321 being convex and an image-side surface 322 being concave. The second lens element 320 is made of a plastic material, and has the object-side surface 321 and the image-side surface 322 being both aspheric.

The third lens element 330 with positive refractive power has an object-side surface 331 being concave and an image-side surface 332 being convex. The third lens element 330 is made of a plastic material, and has the object-side surface 331 and the image-side surface 332 being both aspheric.

The fourth lens element 340 with positive refractive power has an object-side surface 341 being convex and an image-side surface 342 being convex. The fourth lens element 340 is made of a glass material, and has the object-side surface 341 and the image-side surface 342 being both spherical.

The fifth lens element 350 with negative refractive power has an object-side surface 351 being concave and an image-side surface 352 being convex. The fifth lens element 350 is made of a glass material, and has the object-side surface 351 and the image-side surface 352 being both spherical.

The filter 360 is made of a glass material and located between the fifth lens element 350 and the image surface 370, and will not affect the focal length of the image capturing optical lens assembly.

The detailed optical data of the 3rd embodiment are shown in Table 5 and the aspheric surface data are shown in Table 6 below.

TABLE 5

3rd Embodiment
f = 2.28 mm, Fno = 1.55, HFOV = 53.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −26.473 | | 1.000 | Glass | 1.508 | 64.1 | −4.42 |
| 2 | | 2.483 | | 1.191 | | | | |
| 3 | Lens 2 | 4.354 | ASP | 0.925 | Plastic | 1.616 | 23.5 | −26.91 |
| 4 | | 3.169 | ASP | 0.620 | | | | |
| 5 | Lens 3 | −17.827 | ASP | 1.812 | Plastic | 1.616 | 23.5 | 3.85 |
| 6 | | −2.174 | ASP | −0.528 | | | | |
| 7 | Ape. Stop | Plano | | 0.628 | | | | |
| 8 | Lens 4 | 10.229 | | 2.716 | Glass | 1.816 | 23.8 | 3.46 |
| 9 | | −3.438 | | 0.055 | | | | |
| 10 | Lens 5 | −3.274 | | 1.078 | Glass | 1.559 | 56.4 | −6.15 |
| 11 | | −76.241 | | 1.000 | | | | |
| 12 | Filter | Plano | | 0.400 | Glass | 1.508 | 64.2 | — |
| 13 | | Plano | | 1.097 | | | | |
| 14 | Image | Plano | | — | | | | |

Reference wavelength is 940 nm.

TABLE 6

Aspheric Coefficients

| Surface # | 3 | 4 | 5 | 6 |
|---|---|---|---|---|
| k = | 6.1928E−01 | 4.5448E+00 | −1.0000E+00 | 1.2057E−01 |
| A4 = | −9.6099E−03 | −1.5886E−02 | −2.3955E−02 | 6.5980E−04 |
| A6 = | −2.2161E−03 | −4.5856E−03 | −1.9071E−03 | −9.3239E−04 |
| A8 = | 6.3765E−04 | 1.0682E−03 | −2.5136E−03 | 4.3725E−04 |
| A10 = | −1.1988E−04 | −7.2912E−04 | 1.5687E−04 | −1.6067E−04 |
| A12 = | | | −1.1401E−14 | −1.1465E−14 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.28 | TL/f | 5.26 |
| f/EPD | 1.55 | ImgH/EPD | 1.20 |
| HFOV [deg.] | 53.0 | SD11/SDavg | 1.75 |
| FOV [deg.] | 106.0 | SDavg/SDstop | 1.08 |
| Nv30 | 3 | (R5 + R6)/(R5 − R6) | 1.28 |
| Nv40 | 3 | |f4/f1| | 0.78 |

Moreover, according to the 3rd embodiment, a focal length of the second lens element 320 is f2, a focal length of the third lens element 330 is f3, the focal length of the fourth lens element 340 is f4, and a focal length of the fifth lens element 350 is f5, the following conditions are satisfied: |f4|<|f2|; |f4|<|f3|; and |f4|<|f5|.

Furthermore, according to the 3rd embodiment, a composite focal length of the lens elements disposed between an imaged object and the aperture stop 300 (the first lens element 310, the second lens element 320 and the third lens element 330) is a positive value, and a composite focal length of the lens elements disposed between the aperture stop 300 and the image surface 370 (the fourth lens element 340 and the fifth lens element 350) is a positive value.

4th Embodiment

Figure 7:
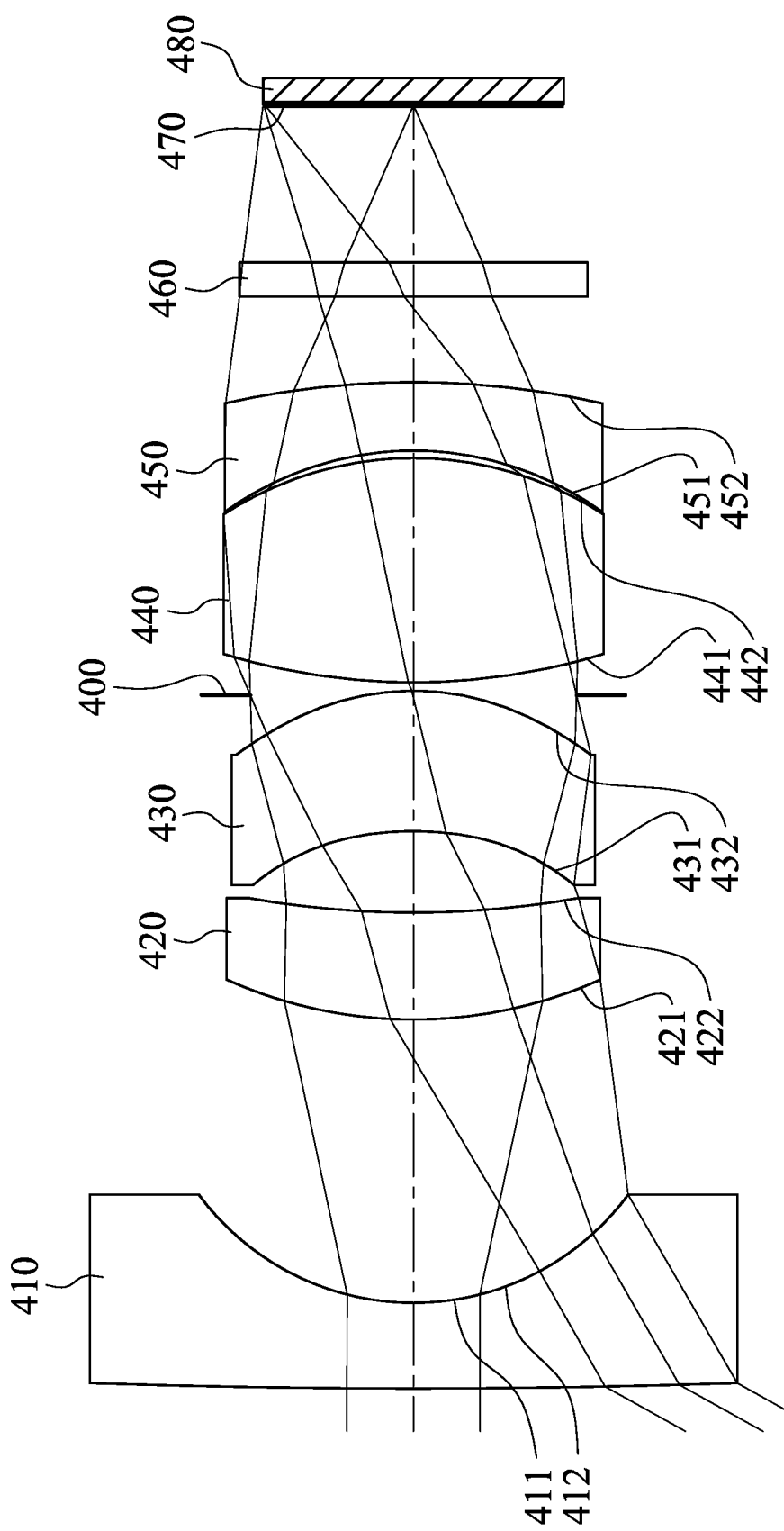
FIG. 7 is a schematic view of an image capturing device according to the 4th embodiment of the present disclosure.
Figure 8:
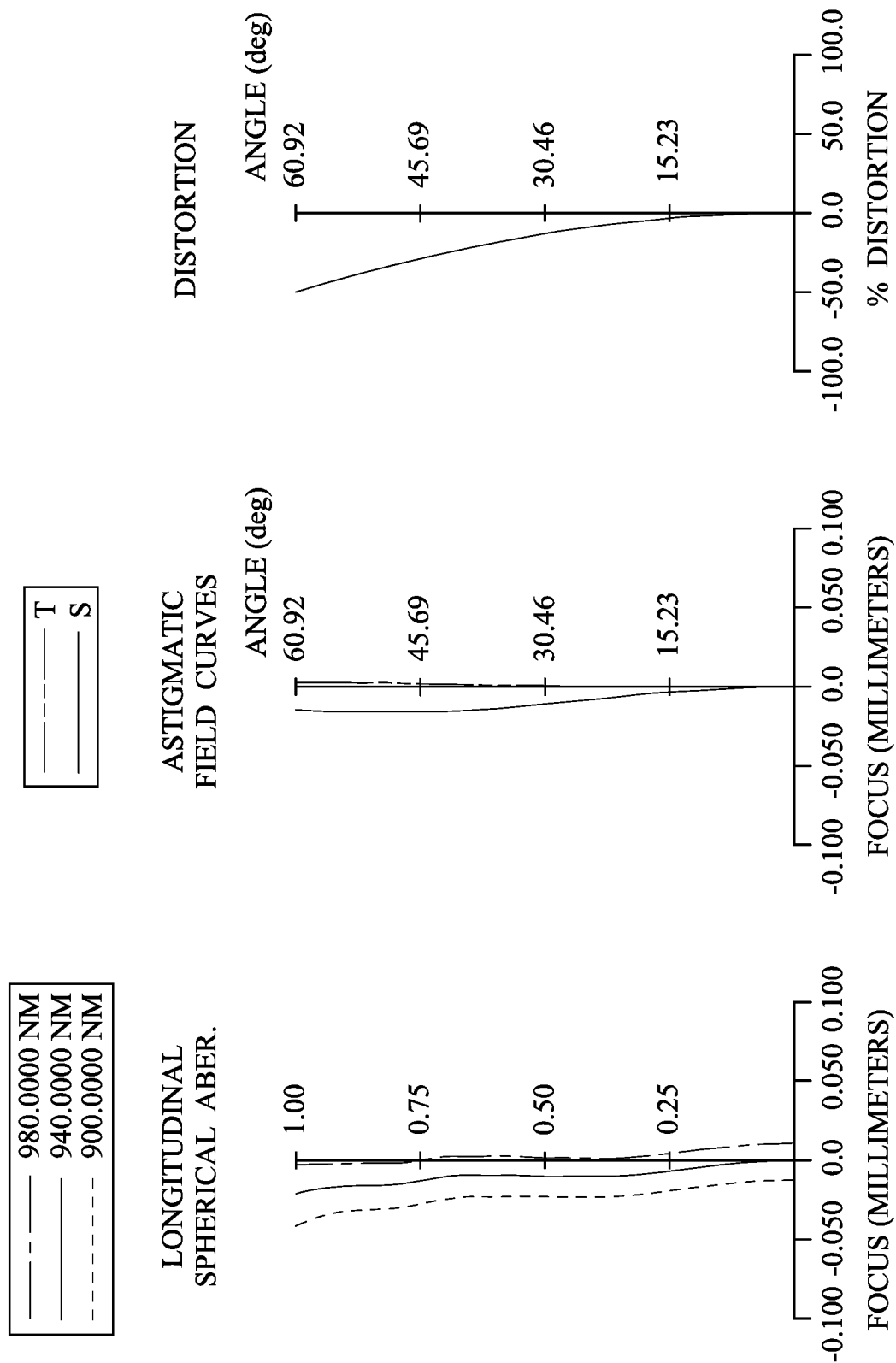
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes an image capturing optical lens assembly (its reference numeral is omitted) and an image sensor 480. The image capturing optical lens assembly includes, in order from an object side to an image side, a first lens element 410, a second lens element 420, a third lens element 430, an aperture stop 400, a fourth lens element 440, a fifth lens element 450, a filter 460 and an image surface 470, wherein the image sensor 480 is disposed on the image surface 470 of the image capturing optical lens assembly. The image capturing optical lens assembly has a total of five lens elements (410-450).

The first lens element 410 with negative refractive power has an object-side surface 411 being convex and an image-side surface 412 being concave. The first lens element 410 is made of a glass material, and has the object-side surface 411 and the image-side surface 412 being both spherical.

The second lens element 420 with positive refractive power has an object-side surface 421 being convex and an image-side surface 422 being concave. The second lens element 420 is made of a glass material, and has the object-side surface 421 and the image-side surface 422 being both spherical.

The third lens element 430 with positive refractive power has an object-side surface 431 being concave and an image-side surface 432 being convex. The third lens element 430 is made of a plastic material, and has the object-side surface 431 and the image-side surface 432 being both aspheric.

The fourth lens element 440 with positive refractive power has an object-side surface 441 being convex and an image-side surface 442 being convex. The fourth lens element 440 is made of a glass material, and has the object-side surface 441 and the image-side surface 442 being both spherical.

The fifth lens element 450 with negative refractive power has an object-side surface 451 being concave and an image-side surface 452 being convex. The fifth lens element 450 is made of a glass material, and has the object-side surface 451 and the image-side surface 452 being both spherical.

The filter 460 is made of a glass material and located between the fifth lens element 450 and the image surface 470, and will not affect the focal length of the image capturing optical lens assembly.

The detailed optical data of the 4th embodiment are shown in Table 7 and the aspheric surface data are shown in Table 8 below.

TABLE 7

4th Embodiment
f = 1.94 mm, Fno = 1.25, HFOV = 60.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 112.493 | 1.000 | Glass | 1.816 | 23.8 | −3.95 |
| 2 | | 3.119 | 3.310 | | | | |
| 3 | Lens 2 | 5.340 | 1.250 | Glass | 1.816 | 23.8 | 11.56 |
| 4 | | 11.016 | 0.950 | | | | |
| 5 | Lens 3 | −3.898 ASP | 1.640 | Plastic | 1.616 | 23.5 | 13.98 |
| 6 | | −3.114 ASP | −0.050 | | | | |
| 7 | Ape. Stop | Plano | 0.150 | | | | |
| 8 | Lens 4 | 7.602 | 2.620 | Glass | 1.816 | 23.8 | 3.61 |
| 9 | | −4.071 | 0.086 | | | | |
| 10 | Lens 5 | −3.749 | 0.800 | Glass | 1.508 | 64.1 | −12.39 |
| 11 | | −9.936 | 1.000 | | | | |
| 12 | Filter | Plano | 0.400 | Glass | 1.508 | 64.2 | — |
| 13 | | Plano | 1.844 | | | | |
| 14 | Image | Plano | — | | | | |

Reference wavelength is 940 nm.

TABLE 8

Aspheric Coefficients

| Surface # | 5 | 6 |
|---|---|---|
| k = | 1.8190E+00 | 1.8855E−01 |

TABLE 8-continued

Aspheric Coefficients

| Surface # | 5 | 6 |
|---|---|---|
| A4 = | −9.8123E−03 | −5.9320E−04 |
| A6 = | 1.3534E−03 | 1.5036E−03 |
| A8 = | −4.3576E−04 | −4.0257E−04 |
| A10 = | 1.2503E−04 | 6.6936E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.94 | TL/f | 7.73 |
| f/EPD | 1.25 | ImgH/EPD | 1.13 |
| HFOV [deg.] | 60.9 | SD11/SDavg | 1.80 |
| FOV [deg.] | 121.8 | SDavg/SDstop | 1.10 |
| Nv30 | 4 | (R5 + R6)/(R5 − R6) | 8.94 |
| Nv40 | 4 | \|f4/f1\| | 0.91 |

Moreover, according to the 4th embodiment, a focal length of the second lens element 420 is f2, a focal length of the third lens element 430 is f3, the focal length of the fourth lens element 440 is f4, and a focal length of the fifth lens element 450 is f5, the following conditions are satisfied: |f4|<|f2|; |f4|<|f3|; and |f4|<|f5|.

Furthermore, according to the 4th embodiment, a composite focal length of the lens elements disposed between an imaged object and the aperture stop 400 (the first lens element 410, the second lens element 420 and the third lens element 430) is a positive value, and a composite focal length of the lens elements disposed between the aperture stop 400 and the image surface 470 (the fourth lens element 440 and the fifth lens element 450) is a positive value.

5th Embodiment

Figure 9:
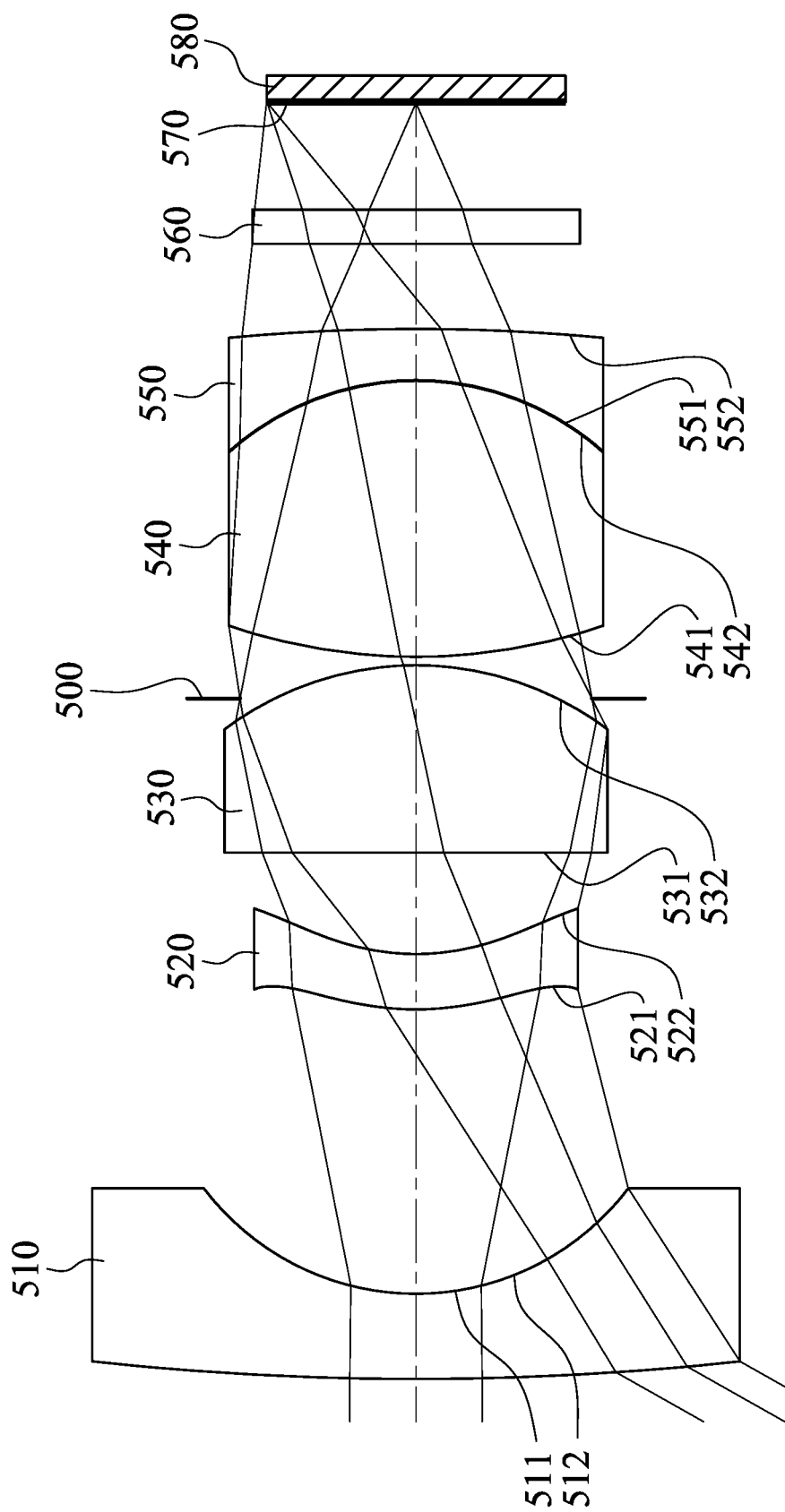
FIG. 9 is a schematic view of an image capturing device according to the 5th embodiment of the present disclosure.
Figure 10:
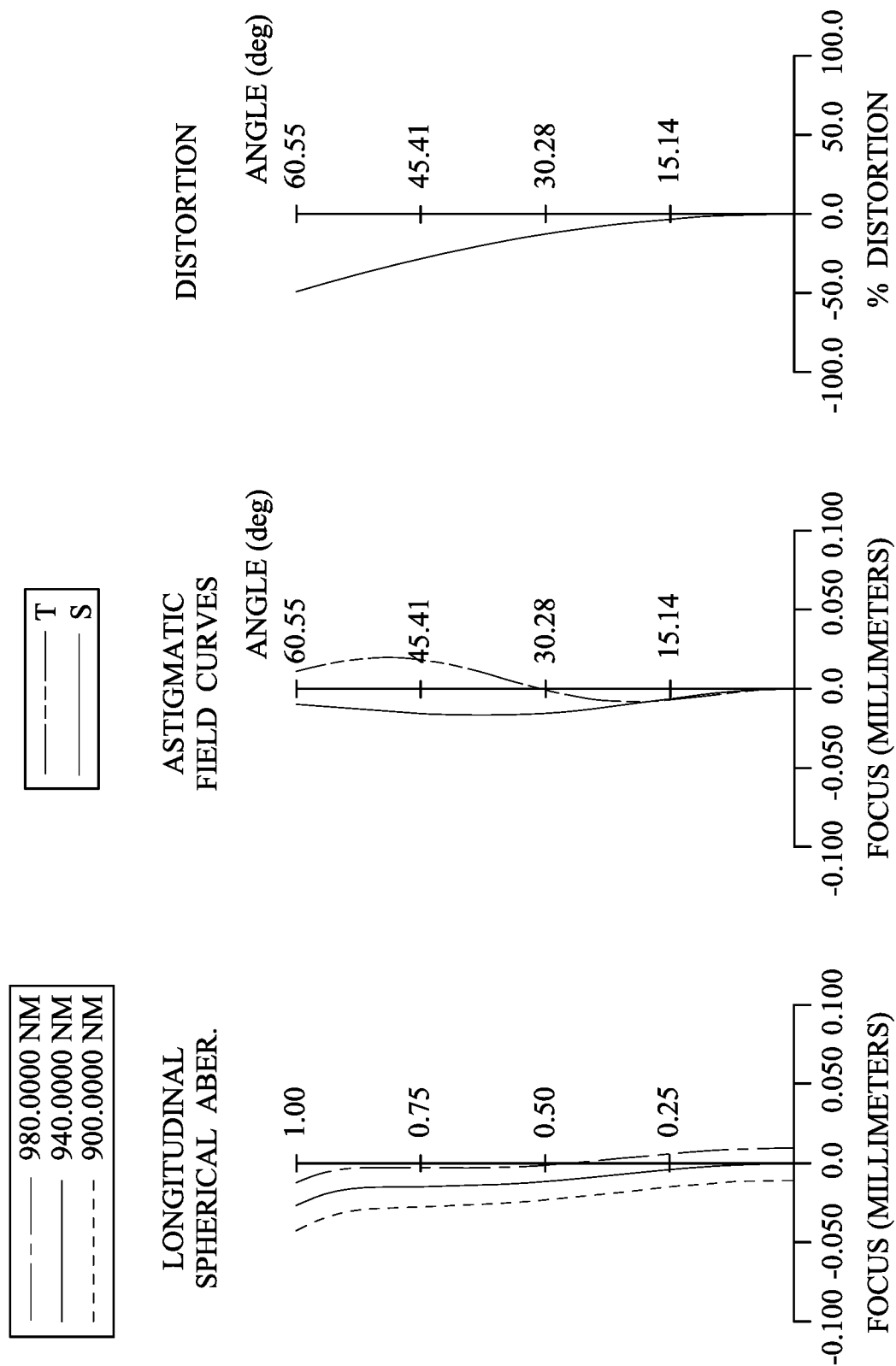
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes an image capturing optical lens assembly (its reference numeral is omitted) and an image sensor 580. The image capturing optical lens assembly includes, in order from an object side to an image side, a first lens element 510, a second lens element 520, a third lens element 530, an aperture stop 500, a fourth lens element 540, a fifth lens element 550, a filter 560 and an image surface 570, wherein the image sensor 580 is disposed on the image surface 570 of the image capturing optical lens assembly. The image capturing optical lens assembly has a total of five lens elements (510-550).

The first lens element 510 with negative refractive power has an object-side surface 511 being convex and an image-side surface 512 being concave. The first lens element 510 is made of a glass material, and has the object-side surface 511 and the image-side surface 512 being both spherical.

The second lens element 520 with negative refractive power has an object-side surface 521 being convex and an image-side surface 522 being concave. The second lens element 520 is made of a plastic material, and has the object-side surface 521 and the image-side surface 522 being both aspheric.

The third lens element 530 with positive refractive power has an object-side surface 531 being planar and an image-side surface 532 being convex. The third lens element 530 is made of a glass material, and has the object-side surface 531 and the image-side surface 532 being both spherical.

The fourth lens element 540 with positive refractive power has an object-side surface 541 being convex and an image-side surface 542 being convex. The fourth lens element 540 is made of a glass material, and has the object-side surface 541 and the image-side surface 542 being both spherical.

The fifth lens element 550 with negative refractive power has an object-side surface 551 being concave and an image-side surface 552 being convex, wherein the image-side surface 542 of the fourth lens element 540 and the object-side surface 551 of the fifth lens element 550 are cemented. The fifth lens element 550 is made of a glass material, and has the object-side surface 551 and the image-side surface 552 being both spherical.

The filter 560 is made of a glass material and located between the fifth lens element 550 and the image surface 570, and will not affect the focal length of the image capturing optical lens assembly.

The detailed optical data of the 5th embodiment are shown in Table 9 and the aspheric surface data are shown in Table 10 below.

TABLE 9

5th Embodiment
f = 1.94 mm, Fno = 1.25, HFOV = 60.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 35.106 | | 1.000 | Glass | 1.816 | 23.8 | −4.26 |
| 2 | | 3.119 | | 3.340 | | | | |
| 3 | Lens 2 | 3.484 | ASP | 0.650 | Plastic | 1.616 | 23.5 | −49.44 |
| 4 | | 2.904 | ASP | 1.190 | | | | |
| 5 | Lens 3 | Plano | | 2.200 | Glass | 1.816 | 23.8 | 4.57 |
| 6 | | −3.729 | | −0.390 | | | | |
| 7 | Ape. Stop | Plano | | 0.490 | | | | |
| 8 | Lens 4 | 6.784 | | 3.240 | Glass | 1.737 | 26.5 | 3.48 |

TABLE 9-continued

5th Embodiment
f = 1.94 mm, Fno = 1.25, HFOV = 60.6 deg.

| Surface # | | Curvature Radius | Thickness | Material | Index | Abbe # | Focal Length |
|---|---|---|---|---|---|---|---|
| 9 | | −3.288 | 0.010 | Cement | 1.501 | 38.8 | |
| 10 | Lens 5 | −3.286 | 0.600 | Glass | 1.816 | 23.8 | −4.75 |
| 11 | | −23.297 | 1.000 | | | | |
| 12 | Filter | Plano | 0.400 | Glass | 1.508 | 64.2 | — |
| 13 | | Plano | 1.265 | | | | |
| 14 | Image | Plano | — | | | | |

Reference wavelength is 940 nm.

TABLE 10

Aspheric Coefficients

| Surface # | 3 | 4 |
|---|---|---|
| k = | 1.4115E−01 | 3.8986E−01 |
| A4 = | −3.6840E−03 | 4.5706E−03 |
| A6 = | −6.9874E−03 | −7.6085E−03 |
| A8 = | 7.6294E−04 | 3.1703E−04 |
| A10 = | −1.4676E−04 | 3.4198E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.94 | TL/f | 7.73 |
| f/EPD | 1.25 | ImgH/EPD | 1.13 |
| HFOV [deg.] | 60.6 | SD11/SDavg | 1.85 |
| FOV [deg.] | 121.2 | SDavg/SDstop | 1.00 |
| Nv30 | 5 | (R5 + R6)/(R5 − R6) | 1.00 |
| Nv40 | 5 | |f4/f1| | 0.82 |

Moreover, according to the 5th embodiment, a focal length of the second lens element 520 is f2, a focal length of the third lens element 530 is f3, the focal length of the fourth lens element 540 is f4, and a focal length of the fifth lens element 550 is f5, the following conditions are satisfied: |f4|<|f2|; |f4|<|f3|; and |f4|<|f5|.

Furthermore, according to the 5th embodiment, a composite focal length of the lens elements disposed between an imaged object and the aperture stop 500 (the first lens element 510, the second lens element 520 and the third lens element 530) is a positive value, and a composite focal length of the lens elements disposed between the aperture stop 500 and the image surface 570 (the fourth lens element 540 and the fifth lens element 550) is a positive value.

6th Embodiment

Figure 11:
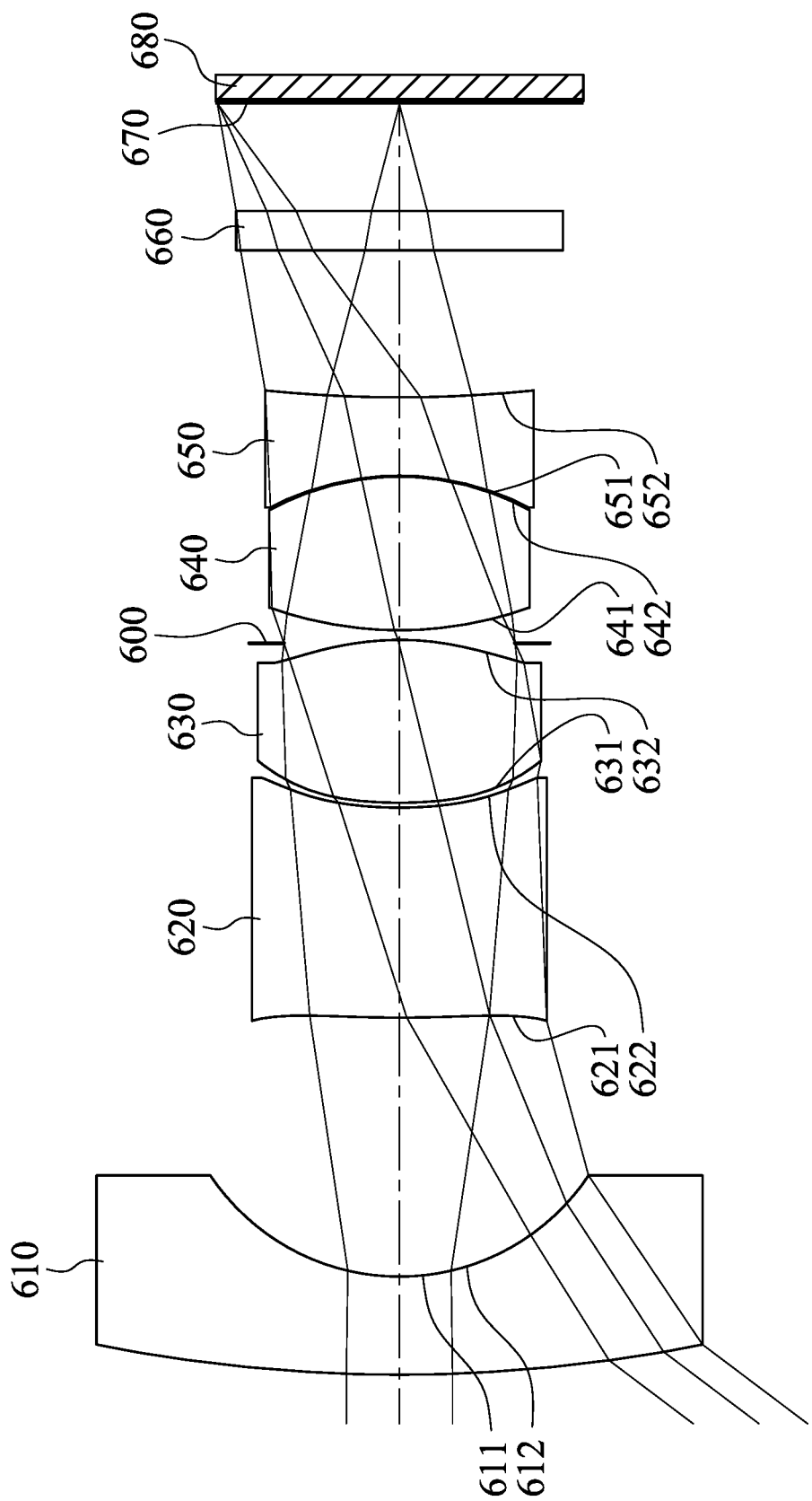
FIG. 11 is a schematic view of an image capturing device according to the 6th embodiment of the present disclosure.

FIG. 11 is a schematic view of an image capturing device according to the 6th embodiment of the present disclosure.

Figure 12:
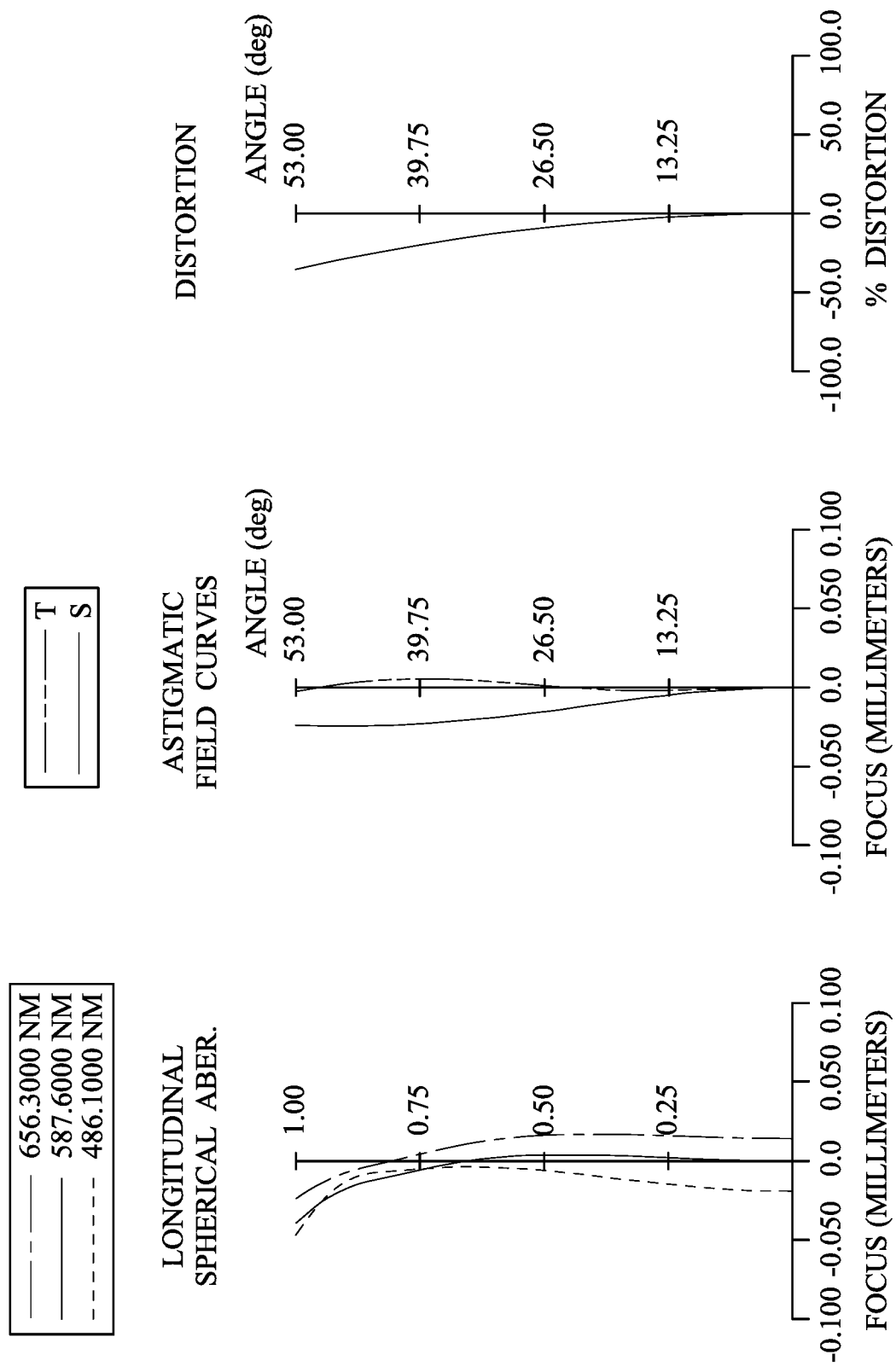
FIG. 12 shows spherical aberration curves, astigmatic field curves and a distortion curve of the image capturing device according to the 6th embodiment.

FIG. 12 shows spherical aberration curves, astigmatic field curves and a distortion curve of the image capturing device according to the 6th embodiment. In FIG. 11, the image capturing device includes an image capturing optical lens assembly (its reference numeral is omitted) and an image sensor 680. The image capturing optical lens assembly includes, in order from an object side to an image side, a first lens element 610, a second lens element 620, a third lens element 630, an aperture stop 600, a fourth lens element 640, a fifth lens element 650, a filter 660 and an image surface 670, wherein the image sensor 680 is disposed on the image surface 670 of the image capturing optical lens assembly. The image capturing optical lens assembly has a total of five lens elements (610-650).

The first lens element 610 with negative refractive power has an object-side surface 611 being convex and an image-side surface 612 being concave. The first lens element 610 is made of a glass material, and has the object-side surface 611 and the image-side surface 612 being both spherical.

The second lens element 620 with negative refractive power has an object-side surface 621 being convex and an image-side surface 622 being concave. The second lens element 620 is made of a plastic material, and has the object-side surface 621 and the image-side surface 622 being both aspheric.

The third lens element 630 with positive refractive power has an object-side surface 631 being convex and an image-side surface 632 being convex. The third lens element 630 is made of a plastic material, and has the object-side surface 631 and the image-side surface 632 being both aspheric.

The fourth lens element 640 with positive refractive power has an object-side surface 641 being convex and an image-side surface 642 being convex. The fourth lens element 640 is made of a glass material, and has the object-side surface 641 and the image-side surface 642 being both spherical.

The fifth lens element 650 with negative refractive power has an object-side surface 651 being concave and an image-side surface 652 being concave. The fifth lens element 650 is made of a glass material, and has the object-side surface 651 and the image-side surface 652 being both spherical.

The filter 660 is made of a glass material and located between the fifth lens element 650 and the image surface 670, and will not affect the focal length of the image capturing optical lens assembly.

The detailed optical data of the 6th embodiment are shown in Table 11 and the aspheric surface data are shown in Table 12 below.

TABLE 11

5th Embodiment
f = 2.17 mm, Fno = 2.00, HFOV = 53.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 15.723 | | 1.000 | Glass | 1.729 | 54.7 | -3.85 |
| 2 | | 2.318 | | 2.643 | | | | |
| 3 | Lens 2 | 12.751 | ASP | 2.143 | Plastic | 1.650 | 21.4 | -11.55 |
| 4 | | 4.411 | ASP | 0.050 | | | | |
| 5 | Lens 3 | 4.712 | ASP | 1.661 | Plastic | 1.583 | 30.2 | 3.41 |
| 6 | | -2.990 | ASP | -0.033 | | | | |
| 7 | Ape. Stop | Plano | | 0.133 | | | | |
| 8 | Lens 4 | 3.924 | | 1.566 | Glass | 1.729 | 54.7 | 2.46 |
| 9 | | -2.739 | | 0.010 | | | | |
| 10 | Lens 5 | -2.834 | | 0.800 | Glass | 1.847 | 23.8 | -2.70 |
| 11 | | 13.402 | | 1.500 | | | | |
| 12 | Filter | Plano | | 0.400 | Glass | 1.517 | 64.2 | — |
| 13 | | Plano | | 1.122 | | | | |
| 14 | Image | Plano | | — | | | | |

Reference wavelength is 587.6 nm (d-line).

TABLE 12

Aspheric Coefficients

| Surface # | 3 | 4 | 5 | 6 |
|---|---|---|---|---|
| k = | -2.1881E+01 | 5.6271E+00 | -2.6337E+00 | -1.2068E+00 |
| A4 = | -1.3974E-02 | 2.3244E-02 | 5.3677E-02 | 3.8272E-03 |
| A6 = | -3.7843E-03 | 4.5052E-04 | 6.1253E-03 | 1.7377E-03 |
| A8 = | 7.0819E-04 | -3.6820E-03 | -3.9981E-03 | 1.4177E-03 |
| A10 = | -4.1705E-04 | -9.8145E-04 | -1.5533E-03 | -1.3074E-04 |
| A12 = | 2.8892E-05 | 8.3737E-05 | 8.9816E-04 | 4.6725E-04 |
| A14 = | 2.7690E-05 | 6.9501E-05 | -3.4369E-05 | |
| A16 = | -1.0114E-05 | -6.7525E-06 | -1.3133E-05 | |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.17 | TL/f | 5.99 |
| f/EPD | 2.00 | ImgH/EPD | 1.72 |
| HFOV [deg.] | 53.0 | SD11/SDavg | 2.26 |
| FOV [deg.] | 106.0 | SDavg/SDstop | 1.16 |
| Nv30 | 2 | (R5 + R6)/(R5 − R6) | 0.22 |
| Nv40 | 3 | |f4/f1| | 0.64 |

Moreover, according to the 6th embodiment, a focal length of the second lens element 620 is f2, a focal length of the third lens element 630 is f3, the focal length of the fourth lens element 640 is f4, and a focal length of the fifth lens element 650 is f5, the following conditions are satisfied: |f4|<|f2|; |f4|<|f3|; and |f4|<|f5|.

Furthermore, according to the 6th embodiment, a composite focal length of the lens elements disposed between the imaged object and the aperture stop 600 (the first lens element 610, the second lens element 620 and the third lens element 630) is a positive value, and a composite focal length of the lens elements disposed between the aperture stop 600 and the image surface 670 (the fourth lens element 640 and the fifth lens element 650) is a positive value.

7th Embodiment

Figure 13:
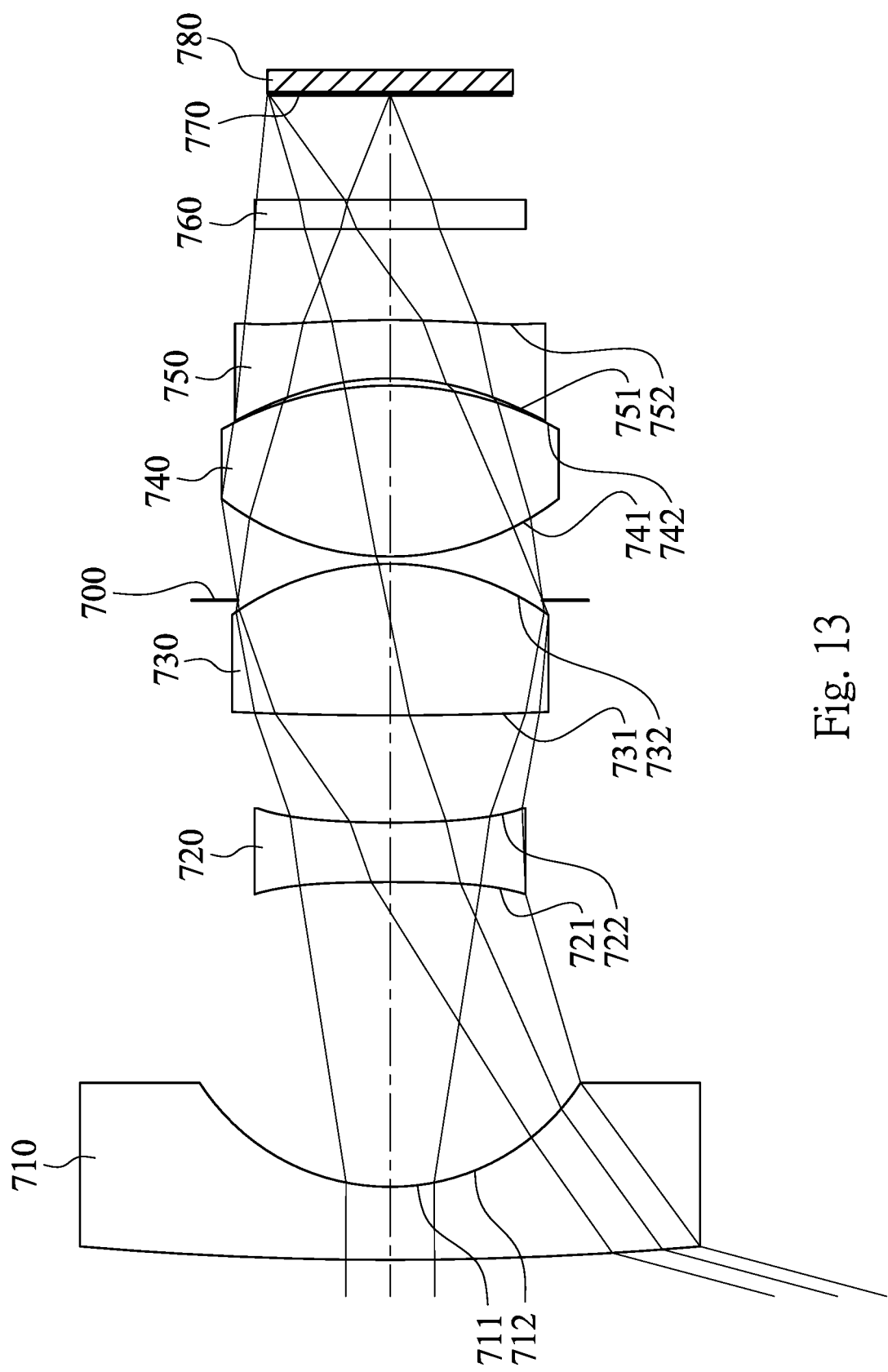
FIG. 13 is a schematic view of an image capturing device according to the 7th embodiment of the present disclosure.
Figure 14:
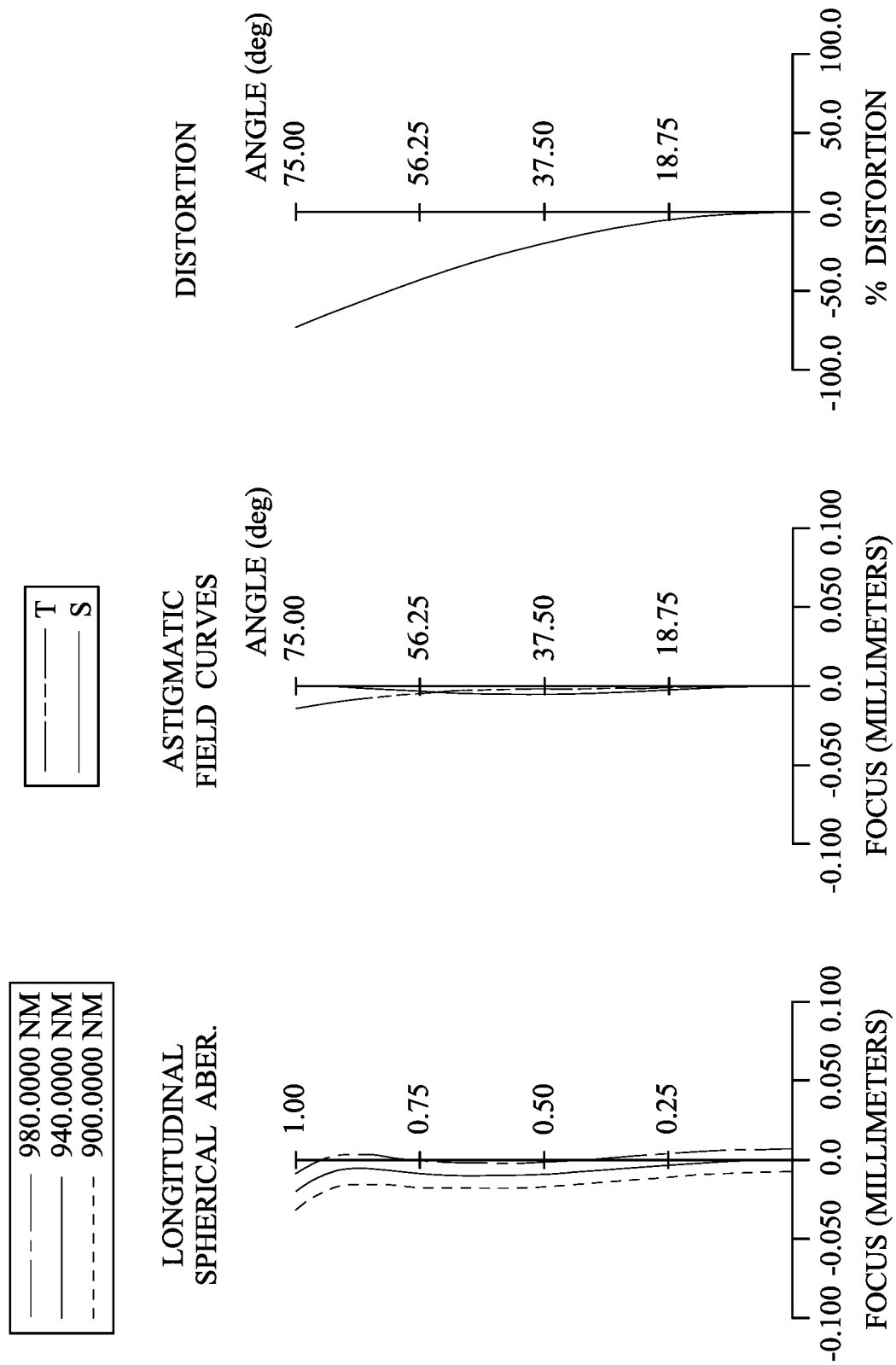
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves and a distortion curve of the image capturing device according to the 7th embodiment. In FIG. 13, the image capturing device includes an image capturing optical lens assembly (its reference numeral is omitted) and an image sensor 780. The image capturing optical lens assembly includes, in order from an object side to an image side, a first lens element 710, a second lens element 720, a third lens element 730, an aperture stop 700, a fourth lens element 740, a fifth lens element 750, a filter 760 and an image surface 770, wherein the image sensor 780 is disposed on the image surface 770 of the image capturing optical lens assembly. The image capturing optical lens assembly has a total of five lens elements (710-750).

The first lens element 710 with negative refractive power has an object-side surface 711 being convex and an image-side surface 712 being concave. The first lens element 710 is made of a glass material, and has the object-side surface 711 and the image-side surface 712 being both spherical.

The second lens element 720 with negative refractive power has an object-side surface 721 being concave and an image-side surface 722 being concave. The second lens element 720 is made of a plastic material, and has the object-side surface 721 and the image-side surface 722 being both aspheric.

The third lens element 730 with positive refractive power has an object-side surface 731 being convex and an image-side surface 732 being convex. The third lens element 730 is made of a glass material, and has the object-side surface 731 and the image-side surface 732 being both spherical.

The fourth lens element 740 with positive refractive power has an object-side surface 741 being convex and an image-side surface 742 being convex. The fourth lens element 740 is made of a glass material, and has the object-side surface 741 and the image-side surface 742 being both spherical.

The fifth lens element 750 with negative refractive power has an object-side surface 751 being concave and an image-side surface 752 being convex. The fifth lens element 750 is made of a plastic material, and has the object-side surface 751 and the image-side surface 752 being both aspheric.

The filter 760 is made of a glass material and located between the fifth lens element 750 and the image surface 770, and will not affect the focal length of the image capturing optical lens assembly.

The detailed optical data of the 7th embodiment are shown in Table 13 and the aspheric surface data are shown in Table 14 below.

are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.65 | TL/f | 9.70 |
| f/EPD | 1.35 | ImgH/EPD | 1.37 |
| HFOV [deg.] | 75.0 | SD11/SDavg | 2.07 |
| FOV [deg.] | 150.0 | SDavg/SDstop | 0.98 |
| Nv30 | 3 | (R5 + R6)/(R5 − R6) | 0.86 |
| Nv40 | 4 | |f4/f1| | 1.11 |

Moreover, according to the 7th embodiment, a focal length of the second lens element 720 is f2, a focal length of the third lens element 730 is f3, the focal length of the fourth lens element 740 is f4, and a focal length of the fifth lens element 750 is f5, the following conditions are satisfied: |f4|<|f2|; |f4|<|f3|; and |f4|<|f5|.

Furthermore, according to the 7th embodiment, a composite focal length of the lens elements disposed between an imaged object and the aperture stop 700 (the first lens element 710, the second lens element 720 and the third lens element 730) is a positive value, and a composite focal length of the lens elements disposed between the aperture stop 700 and the image side (the fourth lens element 740 and the fifth lens element 750) is a positive value.

TABLE 13

7th Embodiment
f = 1.65 mm, Fno = 1.35, HFOV = 75.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 49.017 | 1.000 | Glass | 1.816 | 23.8 | −4.10 |
| 2 | | 3.100 | 4.184 | | | | |
| 3 | Lens 2 | −27.442 ASP | 0.814 | Plastic | 1.616 | 23.5 | −14.63 |
| 4 | | 13.576 ASP | 1.471 | | | | |
| 5 | Lens 3 | 48.021 | 2.080 | Glass | 1.654 | 32.2 | 5.35 |
| 6 | | −3.706 | −0.502 | | | | |
| 7 | Ape. Stop | Plano | 0.602 | | | | |
| 8 | Lens 4 | 3.763 | 2.347 | Glass | 1.508 | 64.2 | 4.54 |
| 9 | | −4.727 | 0.098 | | | | |
| 10 | Lens 5 | −3.892 ASP | 0.800 | Plastic | 1.616 | 23.5 | −8.58 |
| 11 | | −15.908 ASP | 1.250 | | | | |
| 12 | Filter | Plano | 0.400 | Glass | 1.508 | 64.2 | — |
| 13 | | Plano | 1.453 | | | | |
| 14 | Image | Plano | — | | | | |

Reference wavelength is 940 nm.

TABLE 14

Aspheric Coefficients

| | Surface # | | | |
|---|---|---|---|---|
| | 3 | 4 | 10 | 11 |
| k = | −1.0000E+00 | 8.7013E+00 | 4.4901E−01 | −1.0000E+00 |
| A4 = | −7.0724E−03 | 2.7246E−03 | 1.5880E−03 | 2.3059E−03 |
| A6 = | −7.0495E−04 | 2.6736E−04 | −3.1079E−04 | 1.5767E−04 |
| A8 = | 2.1820E−04 | 2.5971E−04 | 3.3283E−04 | 1.5390E−04 |
| A10 = | −4.7408E−05 | 1.1719E−06 | −3.4083E−05 | −6.6280E−06 |
| A12 = | 3.0143E−19 | 3.0237E−19 | 7.9167E−10 | 6.3261E−09 |
| A14 = | 4.6353E−21 | 4.6320E−21 | 4.6342E−21 | 4.6313E−21 |
| A16 = | 6.9391E−23 | 6.9361E−23 | 6.9362E−23 | 6.9361E−23 |

In the 7th embodiment, the equation of the aspheric surface profiles of the aforementioned lens elements is the same as the equation of the 1st embodiment. Also, the definitions of these parameters shown in the following table

8th Embodiment

Figure 15:
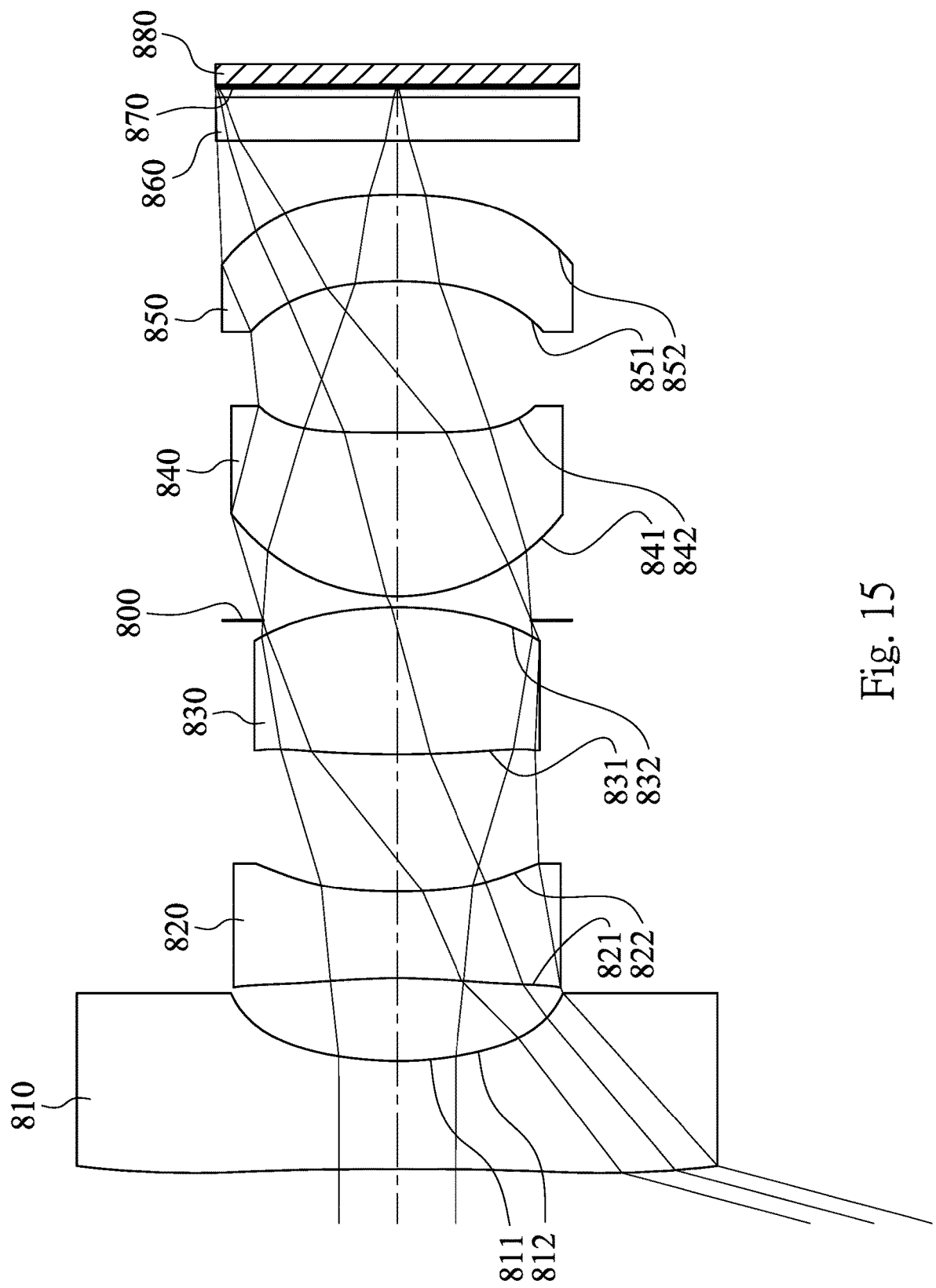
FIG. 15 is a schematic view of an image capturing device according to the 8th embodiment of the present disclosure.
Figure 16:
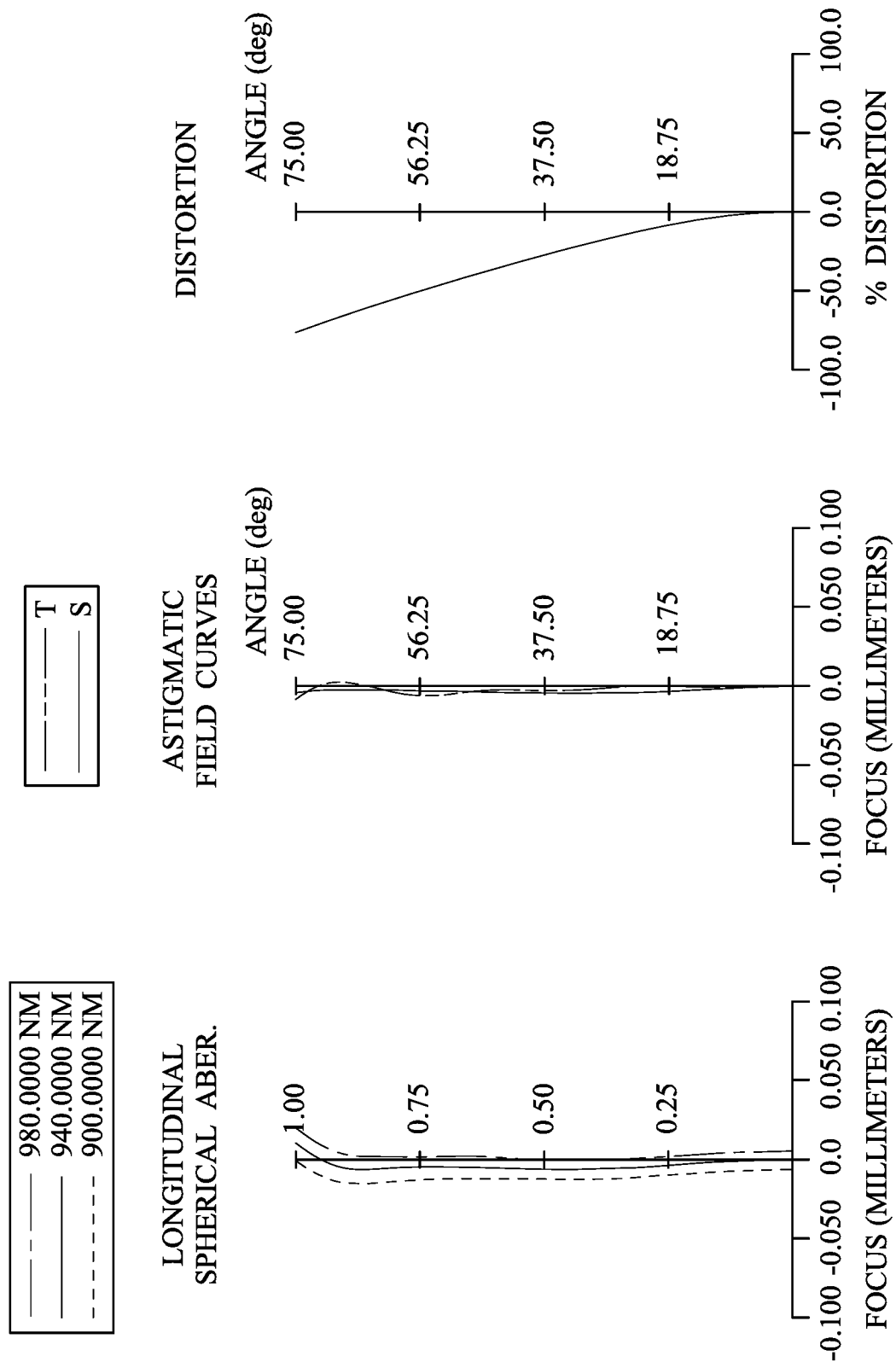
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows spherical aberration curves, astigmatic field curves and a distortion curve of the image capturing device according to the 8th embodiment. In FIG. 15, the image capturing device includes an image capturing optical lens assembly (its reference numeral is omitted) and an image sensor 880. The image capturing optical lens assembly includes, in order from an object side to an image side, a first lens element 810, a second lens element 820, a third lens element 830, an aperture stop 800, a fourth lens element 840, a fifth lens element 850, a filter 860 and an image surface 870, wherein the image sensor 880 is disposed on the image surface 870 of the image capturing optical lens assembly. The image capturing optical lens assembly has a total of five lens elements (810-850).

The first lens element 810 with negative refractive power has an object-side surface 811 being concave and an image-side surface 812 being concave. The first lens element 810 is made of a plastic material, and has the object-side surface 811 and the image-side surface 812 being both aspheric.

The second lens element 820 with negative refractive power has an object-side surface 821 being concave and an image-side surface 822 being concave. The second lens element 820 is made of a plastic material, and has the object-side surface 821 and the image-side surface 822 being both aspheric.

The third lens element 830 with positive refractive power has an object-side surface 831 being convex and an image-side surface 832 being convex. The third lens element 830 is made of a plastic material, and has the object-side surface 831 and the image-side surface 832 being both aspheric.

The fourth lens element 840 with positive refractive power has an object-side surface 841 being convex and an image-side surface 842 being concave. The fourth lens element 840 is made of a plastic material, and has the object-side surface 841 and the image-side surface 842 being both aspheric.

The fifth lens element 850 with negative refractive power has an object-side surface 851 being concave and an image-side surface 852 being convex. The fifth lens element 850 is made of a plastic material, and has the object-side surface 851 and the image-side surface 852 being both aspheric.

The filter 860 is made of a glass material and located between the fifth lens element 850 and the image surface 870, and will not affect the focal length of the image capturing optical lens assembly.

The detailed optical data of the 8th embodiment are shown in Table 15 and the aspheric surface data are shown in Table 16 below.

TABLE 15

8th Embodiment
f = 1.88 mm, Fno = 1.75, HFOV = 75.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −664.758 | ASP | 1.000 | Plastic | 1.626 | 21.5 | −5.16 |
| 2 | | 3.249 | ASP | 0.764 | | | | |
| 3 | Lens 2 | −5.923 | ASP | 0.800 | Plastic | 1.616 | 23.5 | −4.76 |
| 4 | | 6.105 | ASP | 1.266 | | | | |
| 5 | Lens 3 | 11.129 | ASP | 1.362 | Plastic | 1.616 | 23.5 | 4.48 |
| 6 | | −3.500 | ASP | −0.122 | | | | |
| 7 | Ape. Stop | Plano | | 0.222 | | | | |
| 8 | Lens 4 | 1.911 | ASP | 1.514 | Plastic | 1.505 | 56.8 | 3.81 |
| 9 | | 193.947 | ASP | 1.394 | | | | |
| 10 | Lens 5 | −3.551 | ASP | 0.800 | Plastic | 1.616 | 23.5 | −19.28 |
| 11 | | −5.500 | ASP | 0.500 | | | | |
| 12 | Filter | Plano | | 0.400 | Glass | 1.508 | 64.2 | — |
| 13 | | Plano | | 0.096 | | | | |
| 14 | Image | Plano | | — | | | | |

Reference wavelength is 940 nm.

TABLE 16

| Aspheric Coefficients | | | | | |
|---|---|---|---|---|---|
| Surface # | 1 | 2 | 3 | 4 | 5 |
| k = | −1.0000E+00 | 3.1321E+00 | −1.0000E+00 | 1.8176E+01 | −1.0000E+00 |
| A4 = | −1.3451E−02 | −2.5969E−02 | 3.9068E−02 | 6.4150E−02 | 8.5395E−03 |
| A6 = | 5.1078E−03 | 1.7369E−02 | −8.4614E−03 | −1.0235E−02 | −1.0337E−02 |
| A8 = | −7.5513E−04 | −6.8633E−03 | 3.0231E−03 | −6.7530E−03 | 2.7429E−03 |
| A10 = | 5.3419E−05 | 4.0129E−03 | −1.2891E−03 | −1.6801E−03 | −2.9965E−03 |
| A12 = | −1.4898E−06 | −5.5834E−04 | 3.8019E−19 | 3.7999E−19 | 7.7758E−20 |
| A14 = | | | 4.9051E−21 | 4.9017E−21 | |
| A16 = | | | 7.0342E−23 | 7.0312E−23 | |

| Surface # | 6 | 8 | 9 | 10 | 11 |
|---|---|---|---|---|---|
| k = | 8.7460E−01 | −1.0278E−01 | −1.0000E+00 | 3.7054E−01 | −1.0000E+00 |
| A4 = | −6.3512E−03 | 9.8389E−04 | 5.4986E−02 | −4.6831E−02 | −8.0720E−02 |
| A6 = | −2.9836E−03 | 5.6487E−04 | 1.7533E−02 | 1.2161E−03 | 1.4443E−02 |
| A8 = | −1.2667E−03 | 4.0982E−04 | −3.5802E−03 | −7.0745E−03 | −2.6778E−03 |
| A10 = | −8.7844E−05 | −6.2285E−05 | 4.0619E−03 | 1.4577E−03 | 9.8629E−03 |
| A12 = | 7.8658E−20 | 7.8321E−20 | 7.8065E−20 | 7.9167E−10 | 6.3261E−03 |
| A14 = | | | | 4.9040E−21 | 4.9011E−21 |
| A16 = | | | | 7.0313E−23 | 7.0312E−23 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.88 | TL/f | 5.32 |
| f/EPD | 1.75 | ImgH/EPD | 1.55 |
| HFOV [deg.] | 75.0 | SD11/SDavg | 2.12 |
| FOV [deg.] | 150.0 | SDavg/SDstop | 1.13 |
| Nv30 | 4 | (R5 + R6)/(R5 − R6) | 0.52 |
| Nv40 | 4 | |f4/f1| | 0.74 |

Moreover, according to the 8th embodiment, a focal length of the second lens element 820 is f2, a focal length of the third lens element 830 is f3, the focal length of the fourth lens element 840 is f4, and a focal length of the fifth lens element 850 is f5, the following conditions are satisfied: |f4|<|f2|; |f4|<|f3|; and |f4|≤|f5|.

Furthermore, according to the 8th embodiment, a composite focal length of the lens elements disposed between an imaged object and the aperture stop 800 (the first lens element 810, the second lens element 820 and the third lens element 830) is a positive value, and a composite focal length of the lens elements disposed between the aperture stop 800 and the image surface 870 (the fourth lens element 840 and the fifth lens element 850) is a positive value.

9th Embodiment

Figure 18:
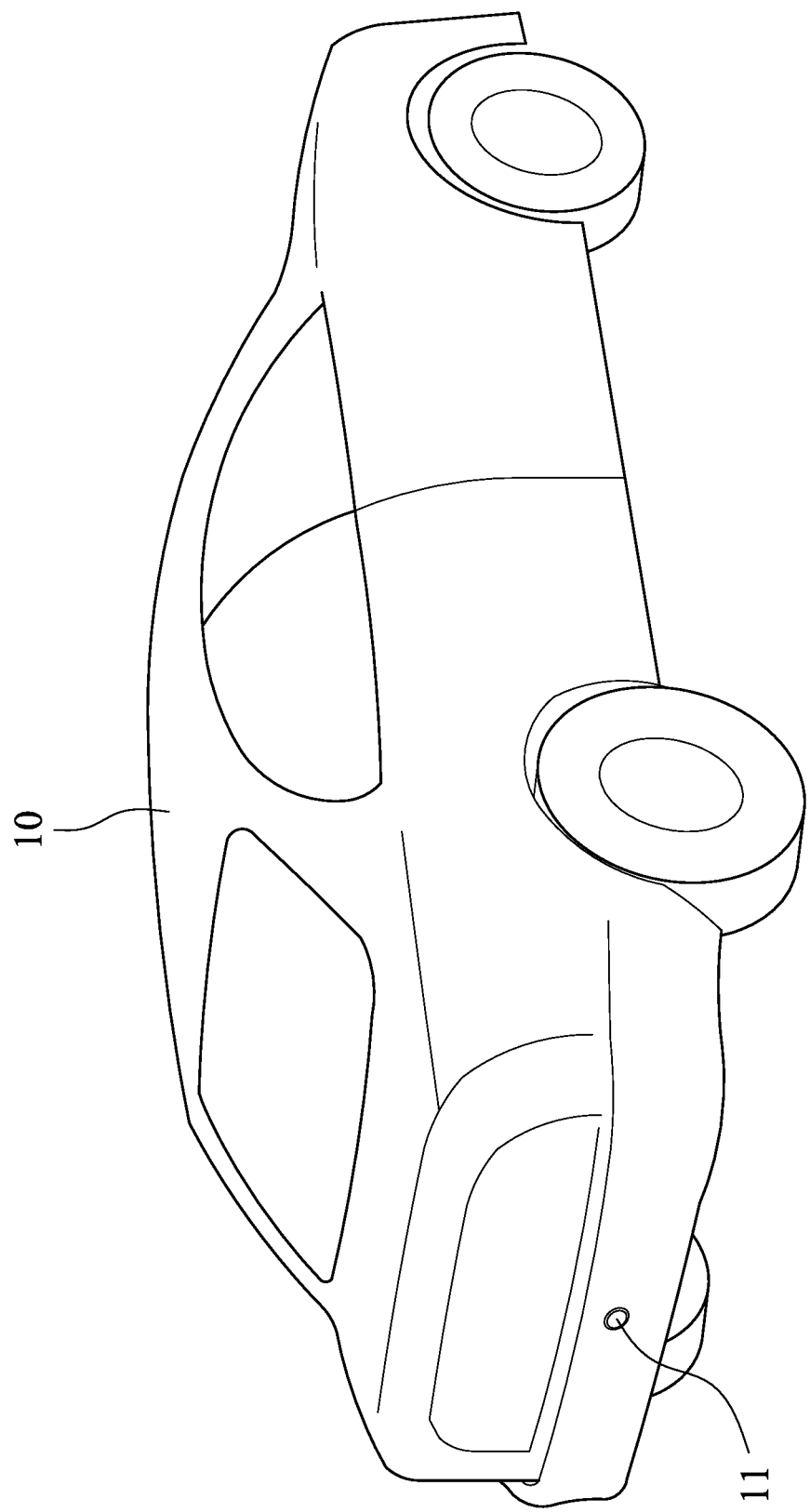
FIG. 18 is a schematic view of an electronic device according to the 9th embodiment of the present disclosure.

FIG. 18 is a schematic view of an electronic device 10 according to the 9th embodiment of the present disclosure. The electronic device 10 of the 9th embodiment is a rearview camera system, wherein the electronic device 10 includes an image capturing device 11. The image capturing device 11 includes an image capturing optical lens assembly (its reference numeral is omitted) according to the present disclosure and an image sensor (its reference numeral is omitted), wherein the image sensor is disposed on an image surface of the image capturing optical lens assembly.

10th Embodiment

Figure 19:
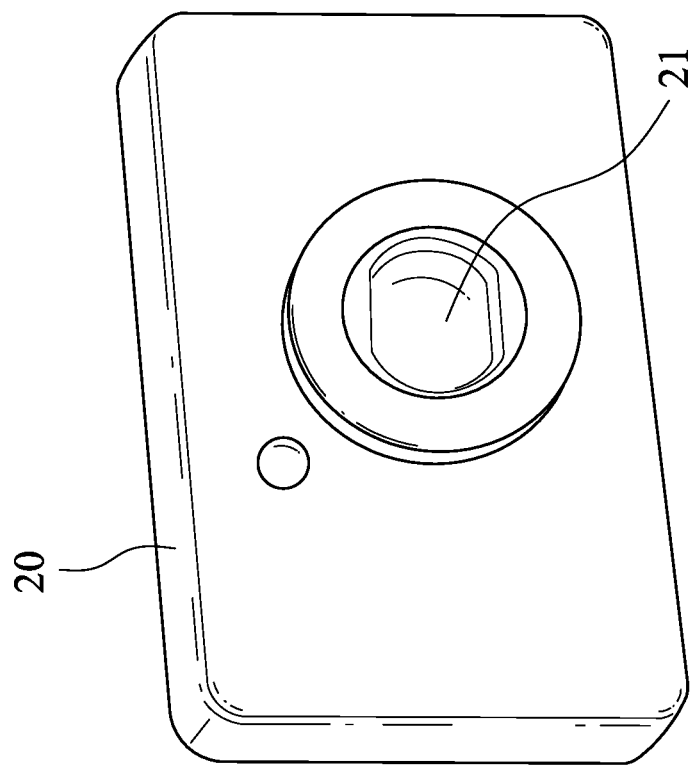
FIG. 19 is a schematic view of an electronic device according to the 10th embodiment of the present disclosure.

FIG. 19 is a schematic view of an electronic device 20 according to the 10th embodiment of the present disclosure. The electronic device 20 of the 10th embodiment is a driving recording system, wherein the electronic device 20 includes an image capturing device 21. The image capturing device 21 includes an image capturing optical lens assembly (its reference numeral is omitted) according to the present disclosure and an image sensor (its reference numeral is omitted), wherein the image sensor is disposed on an image surface of the image capturing optical lens assembly.

11th Embodiment

Figure 20:
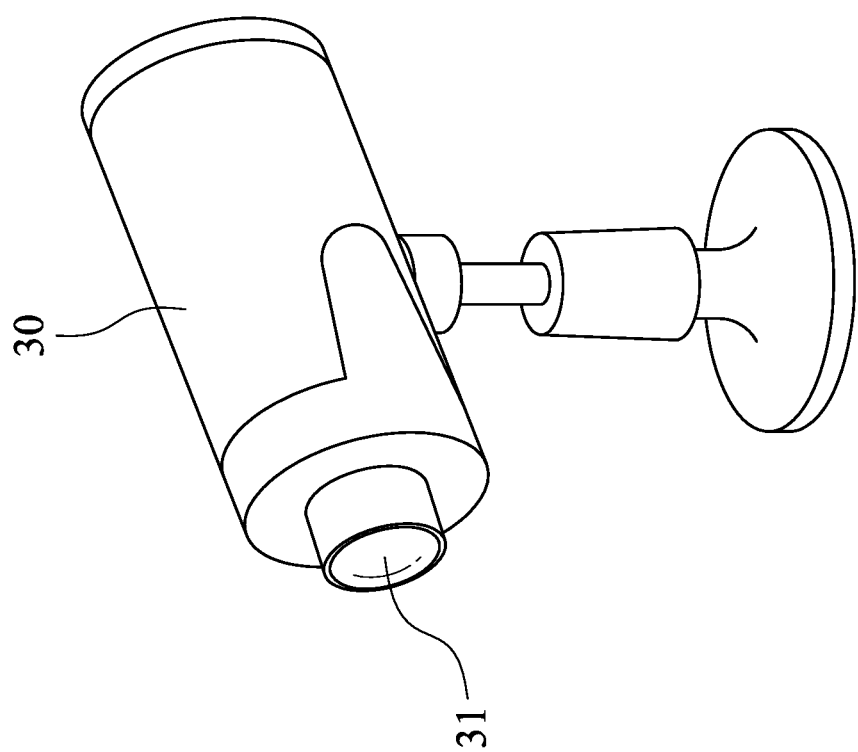
FIG. 20 is a schematic view of an electronic device according to the 11th embodiment of the present disclosure.

FIG. 20 is a schematic view of an electronic device 30 according to the 11th embodiment of the present disclosure. The electronic device 30 of the 11th embodiment is a surveillance system, wherein the electronic device 30 includes an image capturing device 31. The image capturing device 31 includes an image capturing optical lens assembly (its reference numeral is omitted) according to the present disclosure and an image sensor (its reference numeral is omitted), wherein the image sensor is disposed on an image surface of the image capturing optical lens assembly.

The foregoing description, for purpose of explanation, has been described with reference to specific embodiments. It is to be noted that Tables 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing optical lens assembly comprising five lens elements, the five lens elements being, in order from an object side to an image side:
    a first lens element having negative refractive power;
    a second lens element having an object-side surface being convex;
    a third lens element;
    a fourth lens element having an image-side surface being convex; and
    a fifth lens element having negative refractive power;
    wherein a total number of the lens elements in the image capturing optical lens assembly is five, a number of the lens elements having an Abbe number smaller than 40 is Nv40, a focal length of the image capturing optical lens assembly is f, an entrance pupil diameter of the image capturing optical lens assembly is EPD, and the following conditions are satisfied:

$Nv40=5$; and $f/EPD<1.80$.

2. The image capturing optical lens assembly of claim 1, wherein a maximal image height of the image capturing optical lens assembly is ImgH, the entrance pupil diameter of the image capturing optical lens assembly is EPD, and the following condition is satisfied:

$1.0<ImgH/EPD<2.5$.

3. The image capturing optical lens assembly of claim 1, wherein a focal length of the first lens element is f1, a focal length of the fourth lens element is f4, and the following condition is satisfied:

$0.30<|f4/f1|<2.0$.

4. The image capturing optical lens assembly of claim 1, wherein a number of the lens elements having the Abbe number smaller than 30 is Nv30, and the following condition is satisfied:

$4=Nv30$.

5. The image capturing optical lens assembly of claim 1, wherein an axial distance between an object-side surface of the first lens element and an image surface is TL, the focal length of the image capturing optical lens assembly is f, a maximal field of view of the image capturing optical lens assembly is FOV, and the following conditions are satisfied:

$3.0<TL/f$; and $100$ degrees$<FOV$.

6. The image capturing optical lens assembly of claim 1, wherein a focal length of the second lens element is f2, a focal length of the third lens element is f3, a focal length of the fourth lens element is f4, and the following conditions are satisfied:

$|f4|<|f2|$; and $|f4|<|f3|$.

7. The image capturing optical lens assembly of claim 1, further comprising:
    an aperture stop, wherein a composite focal length of the lens elements disposed between the aperture stop and an image surface is a positive value.

8. The image capturing optical lens assembly of claim 1, wherein the second lens element has positive refractive power, and the fourth lens element has positive refractive power.

9. The image capturing optical lens assembly of claim 1, wherein the fifth lens element has an object-side surface being concave.

10. The image capturing optical lens assembly of claim 1, wherein there is an air gap between every adjacent lens elements of the image capturing optical lens assembly, and the fifth lens element has an image-side surface being concave.

11. The image capturing optical lens assembly of claim 1, wherein the first lens element has an image-side surface being concave.

12. The image capturing optical lens assembly of claim 1, wherein the image capturing optical lens assembly is applied to a light wavelength range between 850 nm and 1200 nm.

13. An image capturing device, comprising:
    the image capturing optical lens assembly of claim 1; and
    an image sensor, wherein the image sensor is disposed on an image surface of the image capturing optical lens assembly.

14. An electronic device, comprising:
    the image capturing device of claim 13.

15. An image capturing optical lens assembly comprising five lens elements, the five lens elements being, in order from an object side to an image side:
    a first lens element with negative refractive power having an object-side surface being concave, wherein the object-side surface and an image-side surface of the first lens element are both aspheric;
    a second lens element;
    a third lens element;
    a fourth lens element; and
    a fifth lens element;
    wherein a total number of the lens elements in the image capturing optical lens assembly is five, a number of the lens elements having an Abbe number smaller than 40 is Nv40, a maximal image height of the image capturing optical lens assembly is ImgH, an entrance pupil diameter of the image capturing optical lens assembly is EPD, and the following conditions are satisfied:

$4 \leq Nv40$; and $1.0<ImgH/EPD<2.5$.

16. The image capturing optical lens assembly of claim 15, wherein a number of the lens elements having the Abbe number smaller than 30 is Nv30, and the following condition is satisfied:

$4 \leq Nv30$.

17. The image capturing optical lens assembly of claim 15, wherein a focal length of the first lens element is f1, a focal length of the fourth lens element is f4, and the following condition is satisfied:

$0.30<|f4/f1|<2.0$.

18. The image capturing optical lens assembly of claim 15, wherein the maximal image height of the image capturing optical lens assembly is ImgH, the entrance pupil diameter of the image capturing optical lens assembly is EPD, and the following condition is satisfied:

$1.13 \leq ImgH/EPD<2.5$.

19. The image capturing optical lens assembly of claim 15, wherein a maximal field of view of the image capturing optical lens assembly is FOV, and the following condition is satisfied:

$$100 \text{ degrees} < FOV.$$

20. The image capturing optical lens assembly of claim 15, wherein a focal length of the second lens element is f2, a focal length of the third lens element is f3, a focal length of the fourth lens element is f4, and the following conditions are satisfied:

$$|f4| < |f2|; \text{ and}$$

$$|f4| < |f3|.$$

21. The image capturing optical lens assembly of claim 15, further comprising:
an aperture stop, wherein a composite focal length of the lens elements disposed between the aperture stop and an image surface is a positive value.

22. The image capturing optical lens assembly of claim 15, wherein the number of the lens elements having the Abbe number smaller than 40 is Nv40, and the following condition is satisfied:

$$Nv40=5.$$

23. The image capturing optical lens assembly of claim 15, wherein the second lens element has positive refractive power, the fourth lens element has positive refractive power, and the fifth lens element has negative refractive power.

24. The image capturing optical lens assembly of claim 15, wherein the fifth lens element has an object-side surface being concave.

25. The image capturing optical lens assembly of claim 15, wherein the object-side surface of the first lens element comprises at least one convex shape in an off-axis region thereof.

26. The image capturing optical lens assembly of claim 15, wherein the image capturing optical lens assembly is applied to a light wavelength range between 850 nm and 1200 nm.

27. An image capturing device, comprising:
the image capturing optical lens assembly of claim 15; and
an image sensor, wherein the image sensor is disposed on an image surface of the image capturing optical lens assembly.

28. An electronic device, comprising:
the image capturing device of claim 27.

* * * * *